(12) United States Patent
Kubo

(10) Patent No.: US 7,130,080 B2
(45) Date of Patent: Oct. 31, 2006

(54) IMAGE PROCESSING APPARATUS FOR COLOR CONVERSION

(75) Inventor: Masahiko Kubo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 811 days.

(21) Appl. No.: 09/969,107

(22) Filed: Oct. 3, 2001

(65) Prior Publication Data

US 2002/0048056 A1    Apr. 25, 2002

(30) Foreign Application Priority Data

Oct. 24, 2000    (JP) .................. P. 2000-324772

(51) Int. Cl.
G06K 15/00    (2006.01)

(52) U.S. Cl. .................. 358/2.1; 358/501; 358/502; 358/520

(58) Field of Classification Search .......... 358/1.1, 358/2.1, 501, 502, 520, 1.9, 167; 382/167
See application file for complete search history.

(56) References Cited

U.S. PATENT DOCUMENTS

| | | | | |
|---|---|---|---|---|
| 4,959,669 A | * | 9/1990 | Haneda et al. ............. | 347/115 |
| 5,142,356 A | * | 8/1992 | Usami et al. .............. | 358/518 |
| 5,270,808 A | * | 12/1993 | Tanioka .................... | 358/527 |
| 5,856,876 A | * | 1/1999 | Sasanuma et al. .......... | 358/300 |
| 6,014,457 A | * | 1/2000 | Kubo et al. ................ | 382/167 |
| 6,031,628 A | * | 2/2000 | Jacob et al. ............... | 358/1.9 |

FOREIGN PATENT DOCUMENTS

| | | |
|---|---|---|
| JP | 5-227396 | 9/1993 |
| JP | 06-027776 | 2/1994 |
| JP | 6-135051 | 5/1994 |
| JP | 06135051 A * | 5/1994 |
| JP | 09-307767 | 11/1997 |
| JP | 11-261831 | 9/1999 |
| JP | 2000-078418 | 3/2000 |

* cited by examiner

Primary Examiner—Kimberly Williams
Assistant Examiner—Andrew Lam
(74) Attorney, Agent, or Firm—Morgan, Lewis & Bockius LLP

(57) ABSTRACT

The object of the invention is to provide an image processing apparatus that greatly enhances color conversion precision by considering in-plane uniformity and nonlinearity such as a gradation characteristic and a multiple transfer characteristic in an image formation device when color variation in a plane of the image formation device is considered in color conversion. An arithmetic section converts a signal L* to an image recording signal K of the image formation device based upon a lightness L* signal input from an image input device, a recorded position coordinate signal x in a horizontal scanning direction on paper and the rotation angle signal y of a photo conductor showing a recorded position coordinate in a vertical scanning direction on the photo conductor from the image formation device in consideration of color variation caused due to an image formation process on the photo conductor in the image formation device and the signal L*. This color conversion can be made using n-dimensional DLUT for example. The image recording signal K is output to the image formation device and an image is formed.

4 Claims, 10 Drawing Sheets

IMAGE PROCESSING APPARATUS FOR COLOR CONVERSION

BACKGROUND OF THE INVENTION

1. Field of the Invention

The present invention relates to an image processing apparatus that converts an input chrominance signal to an image recording signal for an image formation device.

2. Description of the Related Art

Recently, as a scanner and a digital camera are popularized in addition to the development of a computer, network service and the development of a mass storage medium, a picture signal is rapidly digitized and a demand for printing such a digital picture signal with high quality rises. To acquire the printout of high quality based upon a digital picture signal, it is important to output an image with color corresponding to color information of an input picture signal. However, the color reproducibility is different every image formation device utilized in printout and when an input digital picture signal is output as it is, faithful color reproduction cannot be expected.

Therefore, an image formation device performs so-called color conversion that an input chrominance signal is converted to an image recording signal according to the color reproduction characteristic of the image formation device so that color faithful to the chromatic information of an input picture signal is reproduced. For the color conversion, a method of using matrix operation, a neural network and a multidimensional look-up table (hereinafter called DLUT) is generally used widely.

For the method of using matrix operation, relation between an input value and an output value is described in a one-dimensional or a high-dimensional determinant and the output value is acquired by operating the determinant based upon the input value. The coefficient of the determinant can be stored in a read only memory (ROM) or a random access memory (RAM) beforehand. The method of using matrix operation has an advantage that only very few parameters are required for color conversion and the capacity of ROM and RAM may be small. However, there is a problem that in case the method of using matrix operation has input-output characteristics high in nonlinearity, it is difficult to acquire the high color conversion precision.

For the method of using the neural network, relation between an input value and an output value is described in a form of a neural network and the output value corresponding to the input value is acquired. The method of using the neural network has an advantage that only relatively few parameters are required for color conversion and in case of input-output characteristics high in nonlinearity, high color conversion precision can be also acquired. However, the method of using the neural network has a problem that as the amount of operation is much, it is not suitable for real time processing.

For the method of using DLUT, an output value is stored at an address of ROM or RAM corresponding to an input signal. The method of using DLUT has an advantage that color conversion can be made at extremely high speed because an output value can be acquired by only applying an input signal as an address and operation time is not substantially required. There is also a case that interpolation is used, however, even in that case, an output value can be acquired by simple operation at high speed. Further, the method of using DLUT has another advantage that as input and output can be freely set in principle, high color conversion precision can be also acquired in case input-output characteristics have high nonlinearity.

As nonlinearity between an input chrominance signal and an image recording signal is generally very high in an image formation device, DLUT which enables high speed processing and the color conversion precision of which is high is widely utilized. However, in an image formation device the in-plane uniformity of which is low, even if color conversion is made using DLUT, it is difficult to realize high color conversion precision. The image formation device the in-plane uniformity of which is low means an image formation device wherein even if a fixed image recording signal is input, color is different depending upon a position on the recording surface of paper. For example, in an image formation device according to an ink-jet recording method and an image formation device according to electrophotography, gray of middle density is output on the whole surface of paper of size A3, the average value of colorimetric values in the plane and color difference between each point of measurement are calculated and the in-plane uniformity is evaluated by the average value and the maximum value of the color difference. For the result of the evaluation, the average value and the maximum value of the color difference are both 1 or less in the ink-jet recording method, while in electrophotography, the color difference the average value of which is approximately 3 to 5 and the maximum value of which is approximately 6 to 10 exists.

When color conversion is actually made using DLUT and color conversion precision is evaluated using color difference between an input chrominance signal and an output colorimetric value, such enough precision as the average value and the maximum value of the color difference are both 1 or less is acquired in the ink-jet recording method the in-plane uniformity of which is high, while in electrophotography the in-plane uniformity of which is low, color difference the average value of which is approximately 3 to 5 and the maximum value of which is approximately 6 to 10 exists. Therefore, in electrophotography, sufficiently high color conversion precision is not acquired. When a color conversion parameter of DLUT is determined, required color of colors in an overall range in which color is to be reproduced in an image formation device is output and a value measured by using a colorimeter is set as the color conversion parameter of DLUT. However, as colorimetric color has an error in an image formation device the in-plane uniformity of which is low, color conversion precision exceeding the in-plane uniformity of the image formation device cannot be acquired in principle. Therefore, in electrophotography, even if color conversion is made by using DLUT generated based upon correspondence with an input chrominance signal and an output colorimetric value, enough precision cannot be acquired.

It is normally said that in case color difference is 1 or less, it is not perceived even if colors are arranged, however, in case color difference is 5 or more, it is perceived without arranging colors. At the above-mentioned color conversion precision acquired in electrophotography, color difference between an input chrominance signal and the color of a printed image can be easily perceived.

Further, there is a problem that when DLUT is applied to color conversion in an image formation device the in-plane uniformity of which is low and a color conversion parameter is determined in consideration of color conversion precision, the color conversion parameter has a random error and the continuity of a color conversion characteristic is deteriorated. When the continuity of the color conversion characteristic is deteriorated as described above, a pseudocontour is formed in an image in case the gradation image is output.

To improve these problems, technique for reducing an error of a colorimetric value caused in an image formation device the in-plane uniformity of which is low is disclosed in JP-A-11-261831 for example. That is, a first color chart having plural color patches of combinations of output values of three colors varied, respectively, and a second color chart having an overall uniform output value are output, and these plural color patches and the color of the uniform output image are measured. Hereby, as an in-plane color variation value is acquired based upon the colorimetric value of the uniform output value image, color variation proper to an image formation device included in the plural color patches is removed based upon the color variation value and three-dimensional DLUT acquired by removing the color variation from these plural color patches is generated.

As the effect of an error by in-plane color variation of an image formation device can be reduced in determining a color conversion parameter value of DLUT according to this method, color conversion precision is enhanced and the formation of a pseudocontour can be reduced. However, according to this method, the effect of an error by color variation in the plane cannot be removed in principle. That is, for the color conversion parameter value of DLUT, an error by in-plane color variation is considered, however, an error by in-plane color variation when recording is actually performed based upon an output chrominance signal to which color conversion is applied by using DLUT occurs. Therefore, there is a problem of color conversion precision that an error equivalent to color variation is left.

FIG. 10 is an explanatory drawing for explaining a problem in one example of a related art. The above-mentioned problem will be described below, referring to FIG. 10. Supposing that in FIG. 10, they-axis and the x-axis respectively show lightness L* and a position on paper and color variation exists on the paper as shown in FIG. 10. In case that a color conversion parameter is determined in a position A on the paper, color difference in the position A is zero by a method of using a measured value for a color conversion parameter as it is as normally performed and color difference in a position B is 2ΔL. In case that the color conversion parameter is determined by using the method disclosed in JP-A-11-261831, since a value acquired by correcting a measured value in the position A with the average value Lave of lightness in the position A and the position B becomes a color conversion parameter, color differences in the position A and the position B are both ΔL. Therefore, average color difference by the method of using the measured value for the color conversion parameter as it is is (0+2ΔL)/2=ΔL and maximum color difference is 2ΔL. In the method disclosed in JP-A-11-261831, average color difference is (ΔL+ΔL)/2=ΔL, maximum color difference is ΔL. Though the method produces effect in reducing the maximum color difference, the effect of reducing the average color difference cannot be expected.

Therefore, in the method disclosed in JP-A-11-261831, in case that a uniform image is output in a plane, color variation caused by the in-plane uniformity of an image formation device is output without correction as it is. Therefore, in an image formation device the in-plane uniformity of which is low such as an electrophotographic printer, color variation in an output image is perceived as irregular color. According to the above described reasons, it is difficult to say that high-precision color conversion can be realized by the method disclosed in JP-A-11-261831.

As described above, in color conversion according to the related art, even if high-precision color conversion represented by DLUT is applied, high color conversion precision cannot be acquired in an image formation device the in-plane uniformity of which is low.

For an image formation method the in-plane uniformity of which is low, an electrophotographic image formation device is representative as described above. For trial to enhance the in-plane uniformity of electrophotography, some methods have been heretofore proposed.

Cause in which the in-plane uniformity of electrophotography is low can be roughly classified into two. One is color variation caused in a plane due to so-called misregistration that an image recorded position is off a desired position due to vibration of a driving system and the mechanical precision of the driving system when an image is recorded on an image carrier such as a photo conductor and a transfer belt. Another is color variation caused in a plane due to an image formation process including electrification, exposure, developing and transfer.

Color variation caused in a plane due to misregistration can be reduced up to a level at which the color variation is not a problem visually by measures including optimization of the mechanism and the control of a driving system, adoption of a rotational screen for differentiating the screen angle of each color, optimization of the number of lines and form of a dot and further, forming a mark for detecting misregistration on an image carrier, measuring misregistration by detecting this mark by a sensor and correcting an image recorded position based upon the amount of measured misregistration. However, as for color variation caused in a plane because of an image formation process such as the electrification, the exposure, the developing and the transfer, decisive possible solution is not proposed as described later. Therefore an electrophotographic image formation device wherein color variation is reduced up to a level at which the color variation is not problem visually has not been realized yet.

Characteristic color variations of color variations caused in a plane in an electrophotographic image formation process will be described below. In an electrophotographic image formation device generally utilized for a copying machine and a printer, an image is formed by exposing an image part by an optical scanner after a photo conductor is evenly charged and making charged toner electrostatically adhere to the photo conductor by a developer. Generally, the photo conductor has in-plane unevenness in the charge and optical sensitivity and has a problem that even if uniform charge, uniform exposure and uniform developing are performed, dispersion occurs in density thereof depending upon a two-dimensional location. The cause in which in-plane unevenness is caused in the charge and the optical sensitivity of the photo conductor greatly depends upon the manufacturing method and the structural problem of the photo conductor. Normally, a photo conductor is manufactured by applying sensitive material such as organic sensitive material onto a pipe or a belt made of conductive material such as aluminum. The sensitive material applied at this time is a few tens um thick and is very thin. The charge and the optical sensitivity of the photo conductor are greatly influenced by the thickness. Therefore, the thickness is required to be unified, however, as the sensitive material is required to be precisely applied in units of micron for that purpose, the cost of the photo conductor is increased and the method is not realistic.

Further, there is a problem that it is difficult to uniformly charge and expose a photo conductor and to uniformly develop on the photo conductor. In developing, unless an interval between a developing roll and a photo conductor is fixed, the quantity of toner used for developing differs and the amount of toner that adheres to the photo conductor disperses. The developing roll and the photo conductor are normally apart by a few hundreds μm. Therefore, high mechanical precision and rigidity are required for a frame for fixing the developing roll and the photo conductor and there is a problem that the cost of the image formation device is increased and the image formation device is large-sized.

In case that a laser scanner is used for exposure, a beam diameter on a photo conductor in a direction of horizontal scanning differs depending upon positional precision between the optical scanner and the photo conductor and unevenness is caused in the electric potential of the photo conductor in the direction of horizontal scanning.

In addition, in a color electrophotographic image formation device, an image is formed by transferring a toner image formed on the photo conductor onto a recording paper on an intermediate transfer belt or on a transfer belt. Generally, as the volume resistivity of the transfer belt is not uniform in a plane of the belt, there is a problem that color variation is caused depending upon a location in a two-dimensional plane. A reason why the color variation is caused by the transfer belt is that it is difficult to manufacture the transfer belt so that the thickness is uniform overall. To adjust the volume resistivity of the transfer belt, carbon black is mixed in plastic such as polyimide which is a base of the transfer belt, however, at that time, as the carbon black is not uniformly dispersed in the plastic, the volume resistivity in a plane of the transfer belt is not fixed.

The transfer efficiency differs depending upon a location of the transfer belt because of such a manufacturing problem. Therefore, when fixed transfer current flows, the density of a transferred image varies to cause color variation. Particularly, it is difficult in manufacture to unify the volume resistivity of an overall transfer belt the transfer efficiency of which is satisfactory, that is, the volume resistivity of which is small and such a transfer belt has a defect that color variation is remarkably caused depending upon a location in a two-dimensional plane of paper. To unify the volume resistivity of the transfer belt, the transfer belt is required to be manufactured so that the thickness is uniform overall and carbon black is required to be uniformly dispersed in the plastic which is the base thereof, however, this causes the increase of the manufacturing cost and is not realistic.

Such an electrophotographic image formation device has a cause that causes in-plane color variation in image formation process thereof including charge, exposure, developing and transfer and color variation is caused in an image on paper depending upon a location in the two-dimensional plane as synthesis of the color variation caused in each image formation process.

In the meantime, in JP-A-6-135051 for example, an image formation device that calculates one-dimensional density correction tables of a horizontal scanning direction and a vertical scanning direction by reading an image pattern formed on a photo conductor and corrects color variation caused in its image formation process by correcting a picture signal referring to the density correction table is disclosed. The method of correcting a picture signal referring to the one-dimensional density correction tables of the horizontal scanning direction and the vertical scanning direction as described above is effective to the correction of the color variation caused by a cause in one dimension being independent of the horizontal scanning direction and the vertical scanning direction. However, since color variation caused on an image carrier such as a photo conductor and a transfer belt exists at random in a two-dimensional plane, it is impossible in principle to correct color variation in the two-dimensional plane by only one-dimensional correction.

Also, in JP-A-5-227396 for example, an image formation device that records an image having fixed density on overall paper, reads the image to store calculated correction value, and corrects in-plane color variation by correcting a read image of a manuscript according to the correction value to output the corrected image when reading the image of the manuscript to perform image recording, and thereby corrects the color variation in a plane of paper is disclosed.

Normally, in an electrophotographic image formation device, it differs depending upon the configuration whether paper and an image carrier such as a photo conductor and a transfer belt are synchronous or not. For a typical example in which paper and an image carrier are synchronous, an image formation device that forms a toner image of each color on one photo conductor and forms a color image by sequentially transferring the toner image of each color on paper on a transfer drum maybe given. In case that the transfer drum is used, since the photo conductor and the transfer drum are synchronized to prevent misregistration, a paper, the photo conductor which is an image carrier and the transfer drum are completely synchronous. Therefore, as represented by this example, in the image formation device wherein the photo conductor and the transfer drum are synchronous, the color variation in a plane of paper has reproducibility.

In the meantime, for a typical example in which paper and an image carrier are asynchronous, an image formation device that forms a plurality of toner images of colors corresponding to a plurality of photo conductors, respectively, and forms a color image by transferring toner images on a paper together after the toner images of the colors corresponding to the plurality of photo conductors is sequentially transferred on an intermediate transfer belt may be given. In case that the intermediate transfer belt is used, since a slight slip is caused between the photo conductor and the intermediate transfer belt to absorb a mechanical dimensional error and an operational error, the photo conductor and the intermediate transfer belt are asynchronous. Normally, since the image formation device is configured so that a reference position of the intermediate transfer belt is detected by a sensor and an image is always transferred in the same position of the intermediate transfer belt, the intermediate transfer belt and a paper are synchronous. Therefore, as paper, the intermediate transfer belt and the photo conductor are not completely synchronous, the color variation in a plane of paper does not have reproducibility in this method.

Therefore, such method of calculating the correction value based upon the output of the image of the fixed density on overall paper and correcting the picture signal according to the correction value as is proposed in JP-A-5-227396 is considered to be effective to the correction of the color variation in the two-dimensional plane of the image formation device in which the paper and the image carrier are synchronous. However, as in-plane color variation varies because the paper and the image carrier are in relative positional relation in the image formation device in which the paper and the image carrier such as a photo conductor and an intermediate transfer belt are asynchronous, such in-plane color variation cannot be corrected.

Further, in the methods proposed in JP-A-6-135051 and JP-A-5-227396, the correction value is determined by measuring the density of the reference image of the fixed density. However, gradation in charge is nonlinear and the amount of the color variation in a plane differs depending upon density. Therefore, there is a problem that when the correction is made based upon the correction value determined based upon the image of an intermediate density as described in these documents, an error is caused in a part of low density and a part of high density, the color variation is not corrected and color variation by excessive correction appears as a defect of an image by irregular color.

In addition, in the methods proposed in JP-A-6-135051 and JP-A-5-227396, the correction value is determined by measuring monochromatic toner. Supposing that these methods are applied to a color image formation device, the same amount of correction is applied to each color. However, when a color image is formed in electrophotography, multiple transfer is performed. The nonlinearity of the multiple transfer has a problem that in a color image of second order color or higher order, a large error is caused by the amount of correction determined based upon a monochrome.

The nonlinearity of multiple transfer means that in case cyan (hereinafter called C), magenta (hereinafter called M) and yellow (hereinafter called Y) for example are output at the ratio of the area of a dot of 50%, C, M and Y are multiply transferred on a transfer belt in the order and gray is output, the toner of C first transferred is heavier than that in the case of a monochrome and the toner of Y finally transferred is lighter than that in the case of a monochrome respectively because of the nonlinearity of multiple transfer. As difference in the weight of toner by multiple transfer normally exists by 10 to 20% in this example, it is clear that a large error is caused in a correction according to the amount of correction determined based upon a monochrome in the case of second color or more.

As described above, in the color conversion according to the related art, since an effect by in-plane color variation cannot be completely considered in the electrophotographic image formation device the in-plane uniformity of which is low even if a high-precision color conversion system represented by DLUT is applied, high color conversion precision cannot be acquired. Also, in the color conversion according to the related art, when a uniform image is output by using an image formation device the in-plane uniformity of which is low, irregular color caused due to in-plane color variation is also perceived as a defect of an image.

In electrophotography, in order to enhance in-plane uniformity, a method of recording an image of fixed density in a plane and correcting a picture signal based upon its measured value is proposed, however, as in this technique, the nonlinearity of a gradation characteristic of electrophotography and the nonlinearity of a multiple transfer characteristic of electrophotography and synchronization between an image carrier and paper are not considered, in-plane color variation cannot be completely corrected in principle.

In the meantime, to enhance in-plane uniformity by improving an image formation process including electrification, developing and transfer, the increase of the cost of a photo conductor and a transfer belt, a large-sized apparatus and high precision are required and are not realistic.

SUMMARY OF THE INVENTION

The invention is made in view of the above-mentioned circumstances and has an object of providing an image processing apparatus wherein color conversion precision is greatly enhanced by considering the nonlinearity such as a gradation characteristic, a multiple transfer characteristic, and the like in an image formation device when the in-plane color variation of the image formation device is considered in color conversion. The invention also has an object of enabling also to acquire a high quality of print high in in-plane uniformity and the reproducibility of color by using such an image processing apparatus in an electrophotographic image formation device the in-plane uniformity of which is low, for example.

The invention is characterized in that an image processing apparatus for converting a first chrominance signal to a second chrominance signal which is an image recording signal for an image formation device, comprises an operating section adapted to convert the first chrominance signal to the second chrominance signal acquired by correcting in-plane color variation caused in the image formation device. Color variation existing at random in a two-dimensional plane and caused in relation to in-plane uniformity can be prevented by such configuration.

The invention is also characterized in that an image processing apparatus for converting a first chrominance signal to a second chrominance signal which is an image recording signal for an image formation device, comprises an operating section adapted to convert the first chrominance signal to the second chrominance signal based upon relation determined based upon a recorded position coordinate signal showing a position where an image is recorded on an image carrier according to the second chrominance signal and the first chrominance signal. As described above, in the invention, color correction based upon a two-dimensional position is enabled by a recorded position coordinate signal showing a position where an image is recorded on an image carrier. Hereby, color variation existing at random in a two-dimensional plane and caused in relation to in-plane uniformity can be prevented. Further, as relation for color conversion is also determined in consideration of a first chrominance signal, color conversion can be made so that no color conversion error is caused even if a gradation characteristic and a multiple transfer characteristic have nonlinearity and color conversion precision can be greatly enhanced.

The image formation device has a plurality of image carriers and can convert color by using a recorded position coordinate signal including the positional information of the respective image carriers of all or a part of the plural image carriers to correspond to a case that these image carriers and paper are operated asynchronously. The image formation device can correct in-plane color variation by using a recorded position coordinates signal including the positional information of the plurality of image carriers as described above in consideration of the positions of respective image carriers asynchronously operated and can realize high-precision color conversion.

Relation used when a first chrominance signal is converted to a second chrominance signal can be acquired by solving a function for acquiring a first chrominance signal based upon a second chrominance signal and a recorded position coordinate signal with the first chrominance signal and the recorded position coordinate signal as an input. The suitable correction of in-plane color variation and color conversion high in the precision of conversion can be simultaneously performed by making color conversion as described above.

Further, a correcting section that updates relation determined in the operating section based upon a first chrominance signal and a recorded position coordinate signal can be provided. Hereby, the image processing apparatus can correspond to different image formation devices and can also correspond to the change of an internal state such as a case that image carriers are replaced in the same image formation device. Generally, as the performance is deteriorated when an image carrier such as a photo conductor and a transfer belt is repeatedly used, replacement is required, however, the unevenness of a density characteristic of an image carrier differs every image carrier. In the meantime, by correcting section, relation used for operation in the operating section can be updated, and suitable color conversion and the correction of in-plane color variation respectively corresponding to the characteristic of an image carrier after replacement can be performed. The image processing apparatus can also correspond to a case that a developing condition and a condition of the formation of a latent image vary except the replacement of image carriers.

Such color conversion can be made utilizing n-dimensional lookup table (DLUT). Hereby, complex operation in color conversion can be omitted and operation speed can be accelerated.

DETAILED DESCRIPTION OF THE PREFERRED EMBODIMENTS

Figure 10:
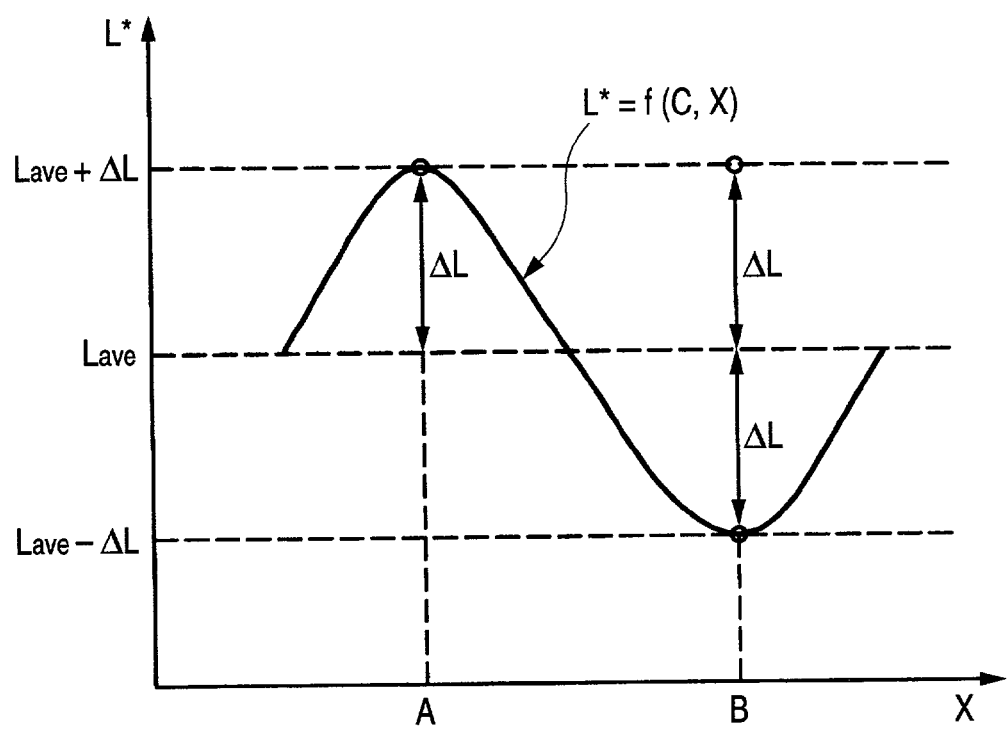
FIG. 10 is an explanatory drawing for explaining a problem in an example of the related art.

First, the principle of the invention will be described. To faithfully reproduce input color in an image formation device where color variation exists in a plane, an image recording signal for the image formation device at that time is uniquely determined if the coordinates of a recorded position on an image carrier related to an image formation process generally causing color variation are considered. This will be schematically described referring to FIG. 10 using a case of a chrominance signal of one variable and one-dimensional recorded position coordinates as an example below. FIG. 10 shows a measured value of lightness L* in a position X on paper in an image formation device the in-plane uniformity of which is low when a fixed image recording signal C is output. Color (Lightness L*) output as described above can be expressed in the following expression by the image recording signal C and the coordinates X of a recorded position of an image.

$$L^* = f(C, X) \quad (1)$$

It is clear that the image recording signal C at that time is determined to be a unique value by specifying the lightness L* and the coordinates X of a recorded position in the expression (1). That is, in case the coordinates X of a recorded position of an input image are considered in addition to input color (lightness L*) in color conversion, the image recording signal C without color difference related to the recorded position coordinates can be determined. For example, when lightness L1* is the same in a position A and a position B, an image recording signal $C_A$ in the position A and an image recording signal $C_B$ in the position B have only to be acquired in the following expressions.

$$L1^* = f(C_A, A)$$

$$L1^* = f(C_B, B)$$

Though the acquired image recording signals are signals to record different colors having the same lightness L1*, colors recorded on paper according to in-plane color change have the same lightness in the position A and the position B. Therefore, when color difference in this case is evaluated, it in the position A and the position B is both zero, the average color difference and the maximum color difference are also zero and it is known that no error of color conversion is caused at all in principle. In case color conversion is made in consideration of the recorded position coordinates of an input image as described above, it is clear that color variation in a plane is corrected even if a uniform image is output and a defect of an image caused due to irregular color can be prevented from being caused.

This is similar even if an input chrominance signal and recorded position coordinates are multi-dimensional and it is clear that even if color variation is caused due to plural asynchronous image carriers, an image recording signal that causes no color difference on the recorded position coordinates of an input image is determined based upon the input chrominance signal and the recorded position coordinates on the plural image carriers.

Further, in the invention, color conversion according to an input chrominance signal is made even in the same position because color conversion is made so that no error of color conversion is caused even if a gradation characteristic and a multiple transfer characteristic have nonlinearity. For example, heretofore, functional relation in conversion to the image recording signal $C_A$ based upon lightness L1* in the position A and functional relation related to another lightness using the similar function were same. That is, the image recording signal $C_A$ was simply acquired using a function $f_A$ acquired only in relation to the position A in an expression $C_A = f_A(L^*)$. However, as described above, as functional relation differs depending upon an input chrominance signal even in the same position because of the nonlinearity of a gradation characteristic and a multiple transfer characteristic, the image recording signal $C_A$ is acquired in an expression $C_A = f_{A,L^*}(L^*)$ using a function $f_{A,L^*}$ acquired in relation to a picture signal L* input together with the position A in the invention. It is conceivable that the above-mentioned function f is an aggregate of functions $f_{A,L^*}$ acquired in relation to the picture signal L* input together with the position A. Actually, an image recording signal related to an input chrominance signal according to functional relation is stored in DLUT so as to facilitate operation.

As described above, as relation for color conversion is also determined in consideration of an input chrominance signal together with a position in a two-dimensional plane, color variation caused due to in-plane uniformity, a gradation characteristic and a multiple transfer characteristic is corrected and color conversion precision can be greatly enhanced.

Figure 1:
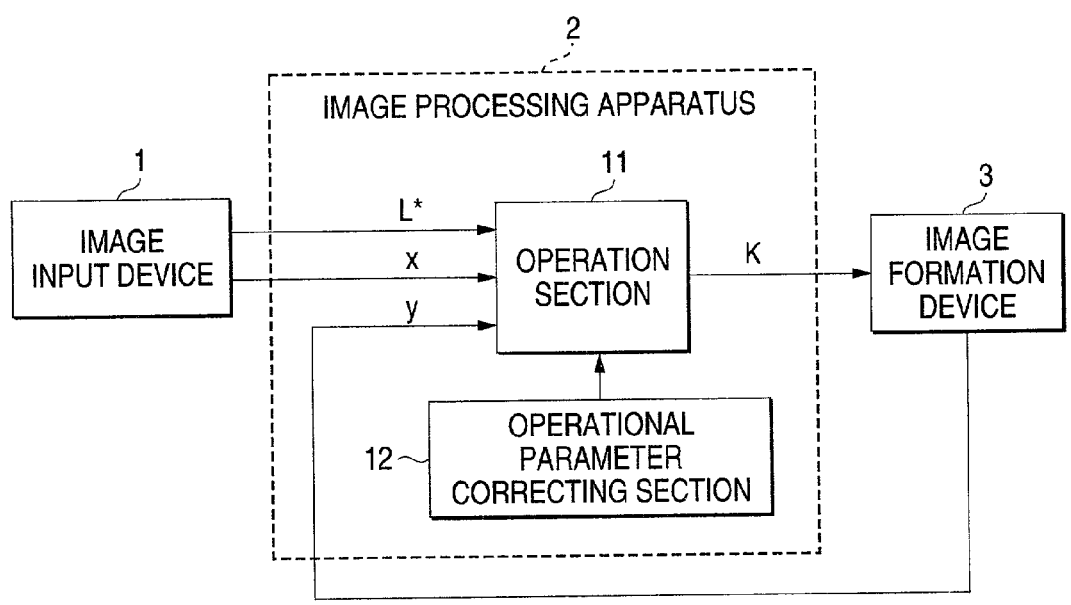
FIG. 1 is a block diagram showing a first embodiment of an image processing apparatus according to the invention.

FIG. 1 is a block diagram showing a first embodiment of an image processing apparatus according to the invention. As shown in FIG. 1, a reference number 1 denotes an image input device, 2 denotes the image processing apparatus, 3 denotes an image formation device, 11 denotes an arithmetic section and 12 denotes an operational parameter correcting section. In the first embodiment, a case in which a monochromatic image formation device 3 is applied is shown. The image processing apparatus 2 according to the invention is connected to the image input device 1 and the image formation device 3 and composes an image output system together with them.

The image input device 1 receives a monochromatic image of various formats from an external device and outputs a picture signal composed of a lightness L* signal in CIEL*a*b* color space which is an equipment-independent chrominance signal and a recorded position coordinate signal x on a one-dimensional coordinate on paper where an image corresponding to the picture signal is formed in this case. The one-dimensional coordinate on paper means a recorded position coordinate in a horizontal scanning direction of a laser scanner 30 described later in the image formation device 3. As this is coincident to the positional coordinate of a picture signal, the recorded position coordinate signal x is input from the image input device 1 to the image processing apparatus 2 in this case. A chrominance signal input from the image input device 1 is most generally a lightness L* signal which is an equipment-independent chrominance signal, however, the invention is not limited to this and the input chrominance signal may be also a signal showing the density, the lightness or the area ratio of a dot respectively which is proper to the image input device and which is not equipment-independent.

Concretely, the image input device 1 can be configured so that it is provided with a function for reading a silver photographic film and a reflected manuscript as an L* signal by a CCD sensor or converting image information sent from equipment connected via a network to an L* signal and transferring the L* signal to the image processing apparatus 2 together with the recorded position coordinate signal x in the horizontal scanning direction on paper of the L* signal. Or the image input device 1 may be also configured so that it rasterizes an electronic manuscript in page description language generated by an application or a printer driver run on a personal computer to a raster signal of L* and transfers the L* signal to the image processing apparatus 2 together with the recorded position coordinate signal x in the horizontal scanning direction on paper of the L* signal.

The image processing apparatus 2 is composed of the arithmetic section 11 and the operational parameter correcting section 12 as a whole. The arithmetic section 11 converts the L* signal to an image recording signal K for the image formation device 3 according to the lightness L* signal input from the image input device 1, the recorded position coordinate signal x in the horizontal scanning direction on paper and a rotation angle signal y of a photo conductor showing the coordinates of a recorded position in a vertical scanning direction on the photo conductor 21 from the image formation device 3 described later in consideration of color variation caused in an image formation process on the photo conductor 21 in the image formation device 3. The image recording signal K is a signal showing the area ratio of a black dot for the image formation device 3. Needless to say, in addition to the black color space of the image formation device 3 which is not equipment-independent, another color space may be also used if only it is monochromatic color space. Further, the operational parameter correcting section 12 suitably corrects an operational parameter in the arithmetic section 11 according to a condition of the image formation device 3.

Figure 2:
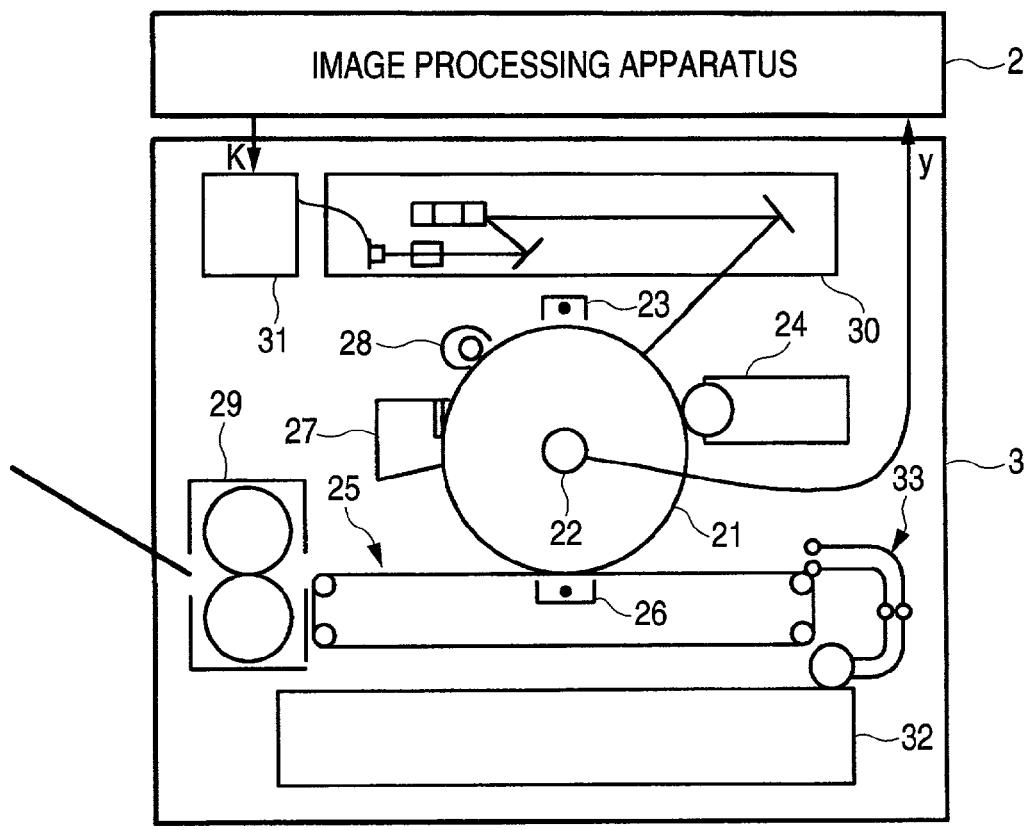
FIG. 2 is a schematic block diagram showing an example of the configuration of an image formation device.

The image formation device 3 forms an image on paper according to the image recording signal K transferred from the image processing apparatus 2. FIG. 2 is a schematic block diagram showing a configuration example of the image formation device 3. As shown in FIG. 2, a reference number 21 denotes a photo conductor, 22 denotes a photo conductor drum encoder, 23 denotes an electrifier for forming an electrostatic latent image, 24 denotes a developer, 25 denotes a paper carrier, 26 denotes a transfer electrifier, 27 denotes a cleaner, 28 denotes a preexposer, 29 denotes a fixing device, 30 denotes the laser scanner, 31 denotes a screen generator, 32 denotes a paper tray and 33 denotes a paper feeder. The photo conductor 21 which is an image carrier is electrified by the electrifier for forming an electrostatic latent image 23, a laser beam the pulse width of which is modulated according to the image recording signal K transferred from the image processing apparatus 2 by the screen generator 31 is horizontally scanned by the laser scanner 30, is radiated on the photo conductor 21 and an electrostatic latent image is formed. As the photo conductor 21 is asynchronous with paper in this case, the rotation angle of the photo conductor 21 is measured by the photo conductor drum encoder 22 to specify the recorded position coordinates on the photo conductor 21 of the input image recording signal and a measured rotation angle signal y is transferred to the image processing apparatus 2. The photo conductor 21 on which an electrostatic latent image is formed is further turned and the electrostatic latent image is developed by black toner by the developer 24.

In the meantime, transfer paper on which an image is recorded is carried from the paper tray 32 onto the paper carrier 25 by the paper feeder 33 and further, the image developed on the photo conductor 21 is transferred on the transfer paper by applying corona discharge from the back by the transfer electrifier 26. The transfer paper holding the transferred image is carried to the fixing device 29 and the final fixed image is acquired by heating and melting the toner image and fixing it on the transfer paper here. In the meantime, the photo conductor 21 is cleaned by the cleaner 27 and preparation for reuse is made by the preexposer 28.

For the photo conductor 21, various organic photoconductors can be used in addition to various inorganic photoconductors (Se, a-Si, a-SiC and CdS). Toner is composed of thermoplastic binder including carbon and well-known material can be used. For one example, polyester toner the weight average molecular weight of which is 54000, the softening point of which is 113° C. and the average particle diameter of which is 7 μm can be used. A condition for exposure or a condition for developing is set so that the amount of toner on a record medium is approximately 0.4 to 0.7 mg/cm². For example, it is desirable that the amount of toner is set to 0.65 mg/cm². For transfer paper as a record medium, paper J manufactured by Fuji Xerox can be used. Needless to say, another record medium may be also used. For a fixing drum in the fixing device 29, a metallic roller or a heating roller provided with a heat resistant elastic layer made of silicon rubber and others on the metallic roller can be used. A heat source is arranged inside the heating roller and its set temperature is determined by the thermally melted characteristic of toner, however, it is set so that the set temperature of the heating roller is higher than the softening point of toner. For example, the heating roller can be set to 160° C.

In the image formation device 3 of the above-mentioned type, as the image formation process including all electrification, exposure and developing is performed on the photo conductor 21 which is an image carrier, in-plane color variation is repeated depending upon a two-dimensional position on the photo conductor 21. In the above-mentioned image formation device 3, as paper and the photo conductor 21 which is an image carrier are asynchronous, a pattern of color variation on the paper is not repeated, however, as the occurrence of color variation in a predetermined two-dimensional position on the photo conductor 21 is repeated, the correction of color variation in a plane and high-precision color conversion can be realized if the two-dimensional recorded position coordinates (x, y) on the photo conductor 21 of an image recording signal are considered. For the two-dimensional recorded position (x, y) on the photo conductor 21, in the configuration example shown in FIG. 1, as a recorded position coordinate x in the horizontal scanning direction is the same as a recorded position coordinate in the horizontal scanning direction on paper, a signal specified by the image input device 1 is used and for a recorded position coordinate y in the vertical scanning direction, only the rotation angle signal y of the photo conductor 21 is measured.

In this case, a general monochromatic electrophotographic method is applied to the image formation device 3, however, the image formation device 3 is not limited to this and may be also any image formation device wherein recording is performed in color space of one variable and an image is formed on a single image carrier. For example, no photo conductor is used for an image carrier and a belt photoconductor may be also used. The image formation device 3 is not limited to an electrophotographic method and may be also any image formation device. In case image formation devices according to an ink-jet method, a thermal transfer method and a silver photographic method for example are an image formation device wherein in-plane color variation is repeated on the recorded position coordinates of an input image on an image carrier, the invention can be also applied to any image formation device.

Figure 3:
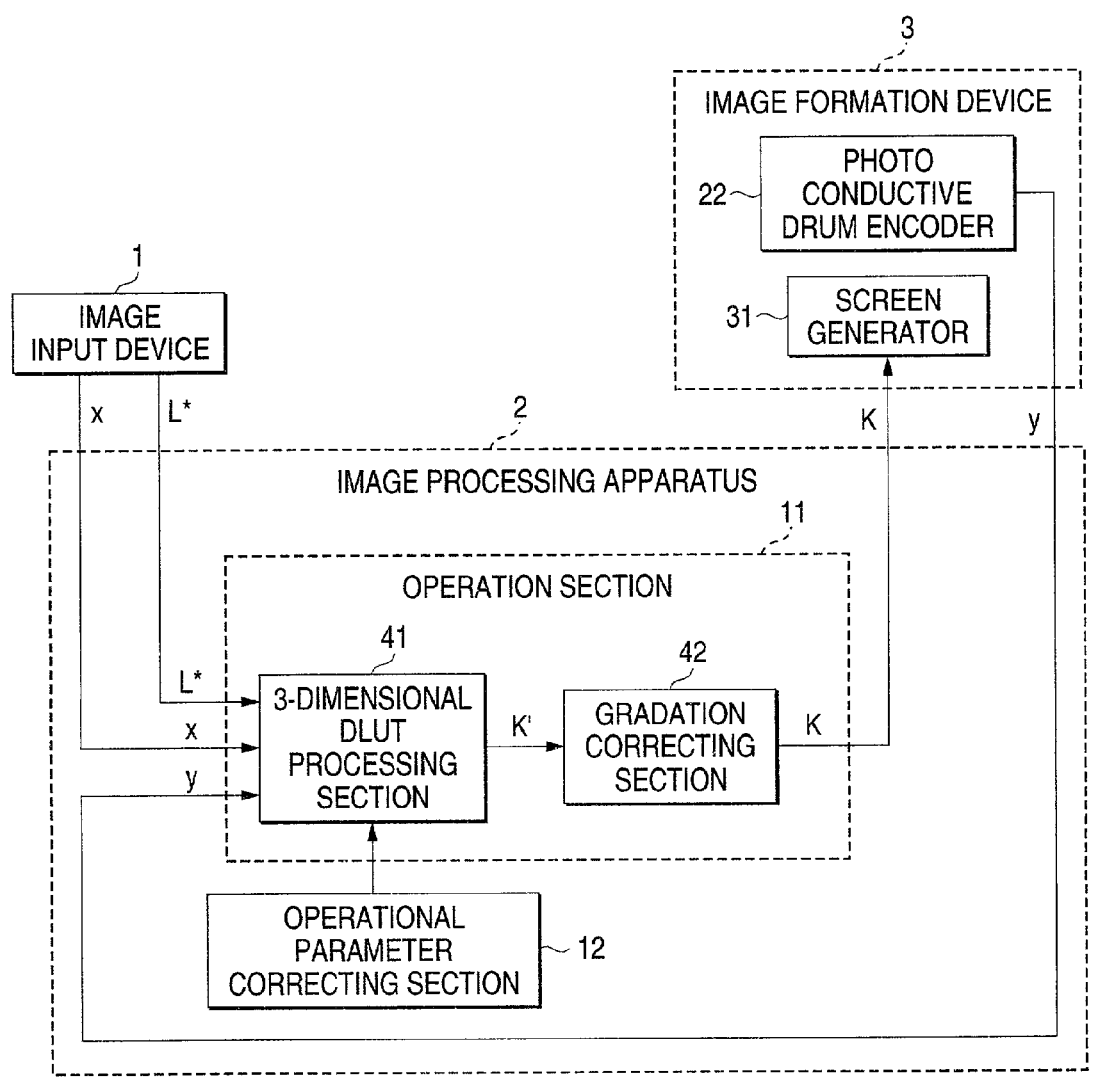
FIG. 3 is a block diagram showing a concrete example in the first embodiment of the image processing apparatus according to the invention.

Next, the image processing apparatus 2 will be further described. FIG. 3 is a block diagram showing a concrete example in the first embodiment of the image processing apparatus according to the invention. As shown in FIG. 3, a reference number 41 denotes a three-dimensional DLUT processing section and 42 denotes a gradation correcting section. A lightness signal L* input from the image input device 1, a recorded position coordinate signal x in the horizontal scanning direction on paper and a rotation angle signal y showing the recorded position coordinate in the vertical scanning direction on the photo conductor of an image recording signal K output by a photo conductor drum encoder 22 of the image formation device 3 are input to the three-dimensional DLUT processing section 41. According to these input signals, three-dimensional interpolation based upon an operational parameter described later is executed, the input lightness signal L* is converted to a lightness linear signal K' and the lightness linear signal K' is transferred to gradation correcting means 212. The lightness linear signal K' is a signal of color space in which the image recording signal K for the image formation device 3 is linearly converted to lightness. The operational parameter correcting section 12 corrects an operational parameter of the three-dimensional DLUT processing section 41 by a method described later.

The gradation correcting section 42 converts the lightness linear signal K' input from the three-dimensional DLUT processing section 41 to the image recording signal K for the image formation device 3 using a one-dimensional lookup table (hereinafter called LUT) and transfers the image recording signal K to the screen generator 31 of the image formation device 3. The one-dimensional LUT in the gradation correcting section 42 can be determined by a well-known method.

In this example, after an image recording signal K for the image formation device 3 is converted to a lightness linear signal K' in color space acquired by lightness linear conversion in the three-dimensional DLUT processing section 41, the lightness linear signal K' is converted to the image recording signal K for the image formation device 3 using one-dimensional LUT in the gradation correcting section 42. This conversion is made to enhance the precision of correction in the three-dimensional DLUT processing section 41 by linearizing the input-output of the three-dimensional DLUT processing section 41 in relation to lightness L*.

In the above-mentioned example, the gradation correcting section 42 is composed of one-dimensional LUT, however, any processing method in which the nonlinear conversion having one input and one output has only to be enabled may be also used. Also, no gradation correcting section 42 is provided and the image recording signal K may be also directly acquired based upon a signal (L*, x, y) in the three-dimensional DLUT processing section 41.

Further, the three-dimensional DLUT processing section 41 will be described. The three-dimensional DLUT processing section 41 holds a correspondence table between input addresses (L*, x, y) as a main operational parameter and a dot signal K as a lookup table and realizes nonlinear conversion having three inputs and one output by performing interpolation for an input signal except the input addresses. For the algorithm of interpolation of the three-dimensional DLUT processing section 41, three-dimensional interpolation algorithm such as well-known cubic interpolation, prismatic interpolation and tetrahedral interpolation can be applied.

The divided number of an input address in the three-dimensional DLUT processing section 41 is arbitrary, however, for example, an input address can be divided so that a lightness signal L* is divided into 16, a recorded position coordinate signal x in the horizontal scanning direction is divided into 30 and the rotation angle signal y of the photo conductor 21 is divided into 27. For example, in the image formation device 3, in case the width of paper in maximum A3 size is 297 mm and the diameter of the photo conductor 21 is 87 mm, an operational parameter can be held at an interval of 10 mm in the horizontal scanning direction and in the vertical scanning direction in conversion to record coordinates of paper. In the image formation device 3 having the configuration shown in FIG. 2 for example, as the exposer has a single laser beam source and in addition, a frequency of the nonuniformity of the sensitivity of the photoconductor is not high so much, a correction value has enough resolution.

Also, as the density of color variation caused when an interval between the developer and the photoconductor is not fixed linearly varies in the horizontal scanning direction, enough correction is also possible in the number of division to this extent. Needless to say, the divided number of an input address held in the three-dimensional DLUT processing section 41 may be also changed depending upon a level of the nonuniformity of the sensitivity of the photo conductor 21 and the number of division in the invention is not limited to the above-mentioned divided number.

As described above, the divided number of input addresses (L*, x, y) is arbitrary and may be also flexibly changed according to the gradation characteristic of the image formation device 3 and a level of in-plane color variation. Concretely, in case the nonlinearity of a gradation characteristic is high, a level of color variation is wrong and a frequency of color variation is high, the number of division may be increased.

In case color variation on paper in either of the horizontal scanning direction or the vertical scanning direction is at an insignificant level, only a signal in either of the horizontal scanning direction x or the vertical scanning direction y has only to be input to the arithmetic section 11. In such a case, as the three-dimensional DLUT processing section 41 has only to make conversion having two inputs and one output, operation has only to be executed by well-known two-dimensional linear interpolation using two-dimensional DLUT.

Figure 4:
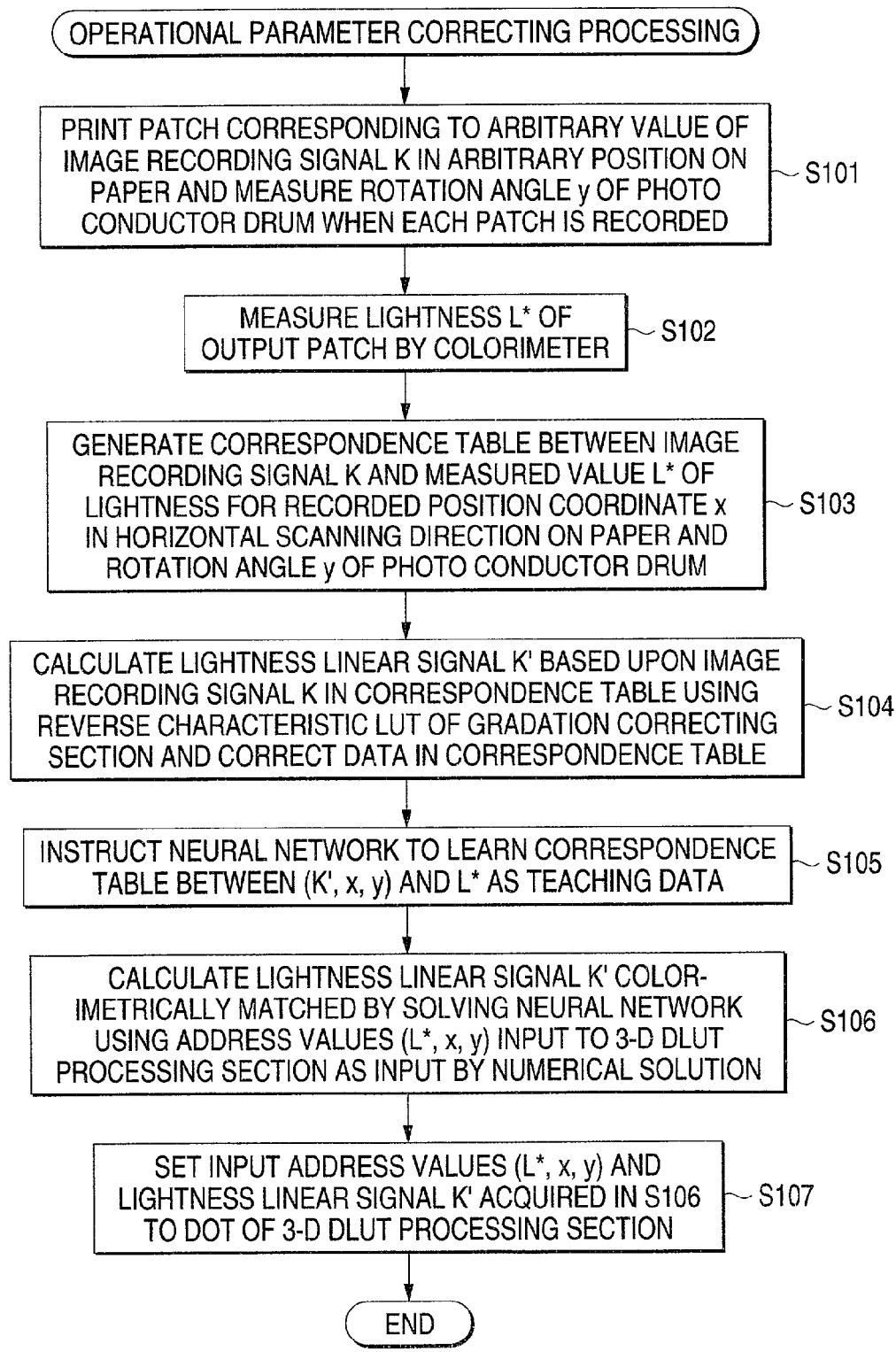
FIG. 4 is a flowchart showing an example of a method of determining an operational parameter of a three-dimensional DLUT processing section by an operational parameter correcting section in the first embodiment of the image processing apparatus according to the invention.
Figure 5:
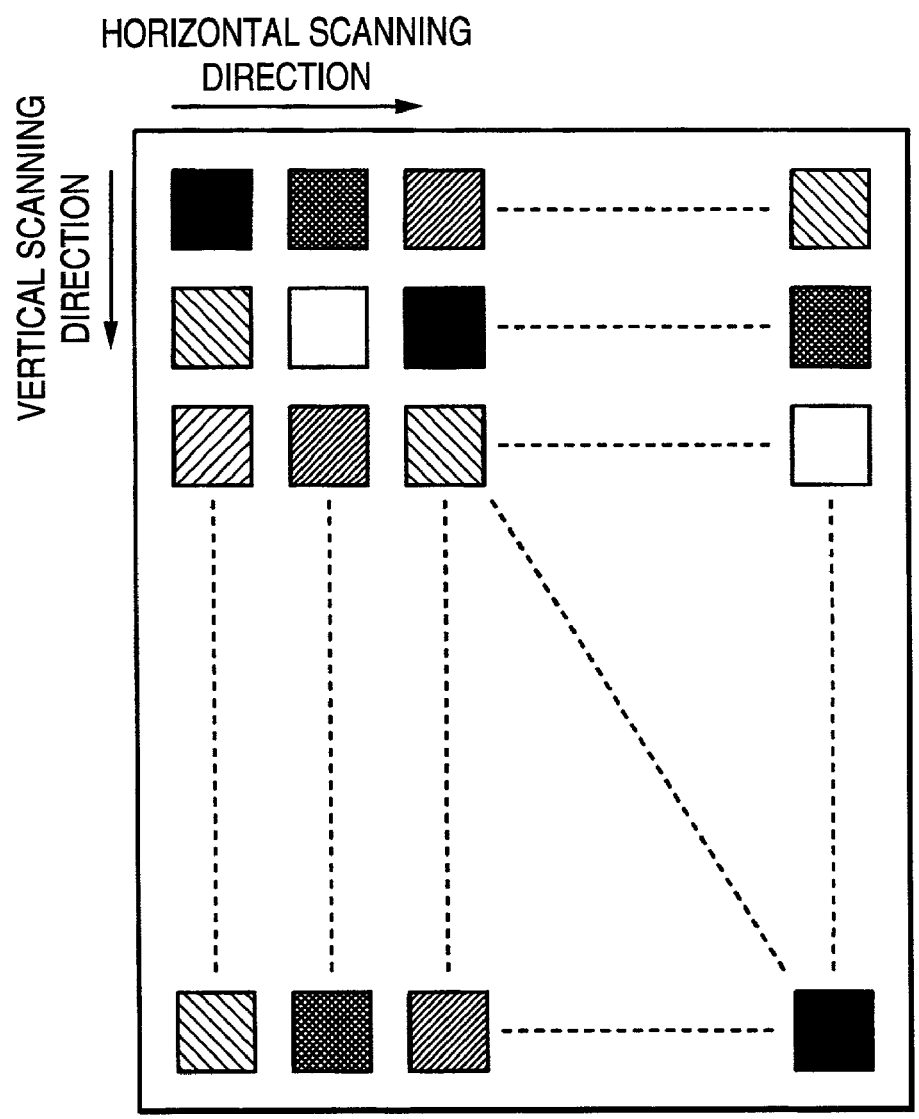
FIG. 5 is an explanatory drawing for explaining an example of patch images output from the image formation device in the example of the method of determining the operational parameter of the three-dimensional DLUT processing section by the operational parameter correcting section in the first embodiment of the image processing apparatus according to the invention.

FIG. 4 is a flowchart showing an example of a method of determining an operational parameter of the three-dimensional DLUT processing section 41 by the operational parameter correcting section 12 in the first embodiment of the image processing apparatus according to the invention and FIG. 5 is an explanatory drawing for explaining an example of a patch image output in the image formation device. First, in S101, in the image formation device 3, a patch for an arbitrary value of the image recording signal K is printed in an arbitrary position on paper as shown in FIG. 5, the rotation angle y of the photo conductor 21 when each patch is recorded is measured and is stored. In an example of patch images shown in FIG. 5, difference in the density and the interval of hatching show that types are different for the convenience of the drawing.

For a patch image, the divided number in the horizontal scanning direction and in the vertical scanning direction on paper as described above in this case is set to an interval of 10 mm, an interval between patches in the horizontal scanning direction and in the vertical scanning direction is set to 10 mm and patches are output on overall paper. Patches different every 10% in the ratio of the area of dots in each patch from 0% to 100% are output at random on paper. Needless to say, the layout of each patch is not limited to an example shown in FIG. 5.

In S102, the lightness L* of an output patch is measured by a colorimeter not shown. For the colorimeter, DTP-51 manufactured by X-Rite for example can be used. The colorimeter is not such a colorimeter on the market but a flatbed scanner may be also used and the lightness L* may be also determined based upon an acquired picture signal.

In S103, a correspondence table between (K, x, y) and L* is generated based upon the result of the measurement of the lightness L* of respective patches, the image recording signal K, recorded position coordinates x in the horizontal scanning direction and the result of the measurement of the rotation angle y of the photo conductor 21.

In S104, a lightness linear signal K' is calculated based upon the image recording signal K using reverse characteristic LUT in the gradation correcting section 42 and a value of the image recording signal K in the correspondence table is modified to the lightness linear signal K'.

In S105, a function having three inputs and one output shown in the following expression with (K', x, y) as input and with L* as output is generated based upon a correspondence table between (K', x, y) and L*.

$$L^* = f(K', x, y) \tag{2}$$

For a method of generating such a function f, the expression (2) can be determined by using a neural network having three inputs and one output for example and learning by backpropagation using the correspondence table between (K', x, y) and L* as teaching data. A method of generating the function f is not limited to the method of using a neural network and any method by which a nonlinear function having three inputs and one output can be described may be used.

In S106, a lightness linear signal K' colorimetrically matched is calculated by solving the expression (2) determined using the neural network based upon an address value (L*, x, y) input to the three-dimensional DLUT processing section 41 by numerical analysis.

Finally in S107, the input address value (L*, x, y) and the lightness linear signal K' acquired in S106 are set to a dot of the three-dimensional DLUT processing section 41.

It is clear that when the lightness L* and recorded position coordinates (x, y) on an image carrier are determined in the expression (2), the only lightness linear signal K' is determined. That is, it is known that if relation between an image recording signal and a chrominance signal is determined in consideration of recorded position coordinates on an image carrier that causes color variation even in an image formation device where in-plane color variation exists, an image recording signal for outputting color accurately matched with input color can be determined. The occurrence of irregular color caused due to color variation on paper is prevented by outputting based upon the image recording signal determined according to such algorithm and color matched with an input chrominance signal can be output.

In the example of the configuration of the arithmetic section 11 shown in FIG. 3, an example that the image recording signal K is calculated based upon an input signal (L*, x, y) using three-dimensional DLUT is shown, however, the invention is not limited to this and operation may be also executed by solving the expression (2) by numeric operation described in S106 at real time.

To verify the effect of the first embodiment of the invention, each color conversion precision in case color conversion considering the recorded position coordinates of an input image is made in the arithmetic section 11 and in case normal color conversion without considering recorded position coordinates is made is evaluated. In the case of normal color conversion without considering the recorded position coordinates of an input image, processing in the three-dimensional DLUT processing section 41 is bypassed and the lightness L* is input to the gradation correcting section 42.

For an image for comparison, black the dot area ratio of which is 10 to 100% is output on overall paper in A3 size, the lightness L* at arbitrary 100 points in a plane is measured and the average value of color difference at each point from average L* in the plane is compared. As a result, average color difference in case normal color conversion without considering the recorded position coordinates of an input image is made is approximately 5, while in the invention, average color difference is 1 or less, color conversion precision is greatly improved and a print the color conversion precision of which is high can be acquired. As color difference depending upon a recorded position of an input image is not caused, irregular color can be reduced up to a level at which color variation is not a problem visually even if a uniform image is output.

As described above, in the first embodiment of the image processing apparatus according to the invention, the image recording signal K of the image formation device 3 is calculated based upon a chrominance signal input from the image input device 1, a recorded position coordinate signal x in the horizontal scanning direction on paper showing a recorded position coordinate on an image carrier of the image recording signal K and a rotation angle signal of the photo conductor using the three-dimensional DLUT. Hereby, in the electrophotographic image formation device 3, even if color variation is caused in a two-dimensional plane on paper by various causes represented by the non-uniformity of the sensitivity of the photoconductor, color difference in a recorded position is prevented and color conversion the precision of which is high can be realized. When a uniform image is output, irregular color as a defect of image quality can be prevented from being caused and an image the in-plane uniformity of which is high can be acquired.

In addition, even if an in-plane color variation characteristic varies due to aging and the replacement of image carriers, suitable color conversion and the correction of in-plane color variation are enabled by regularly correcting an operational parameter of the three-dimensional DLUT processing means.

Figure 6:
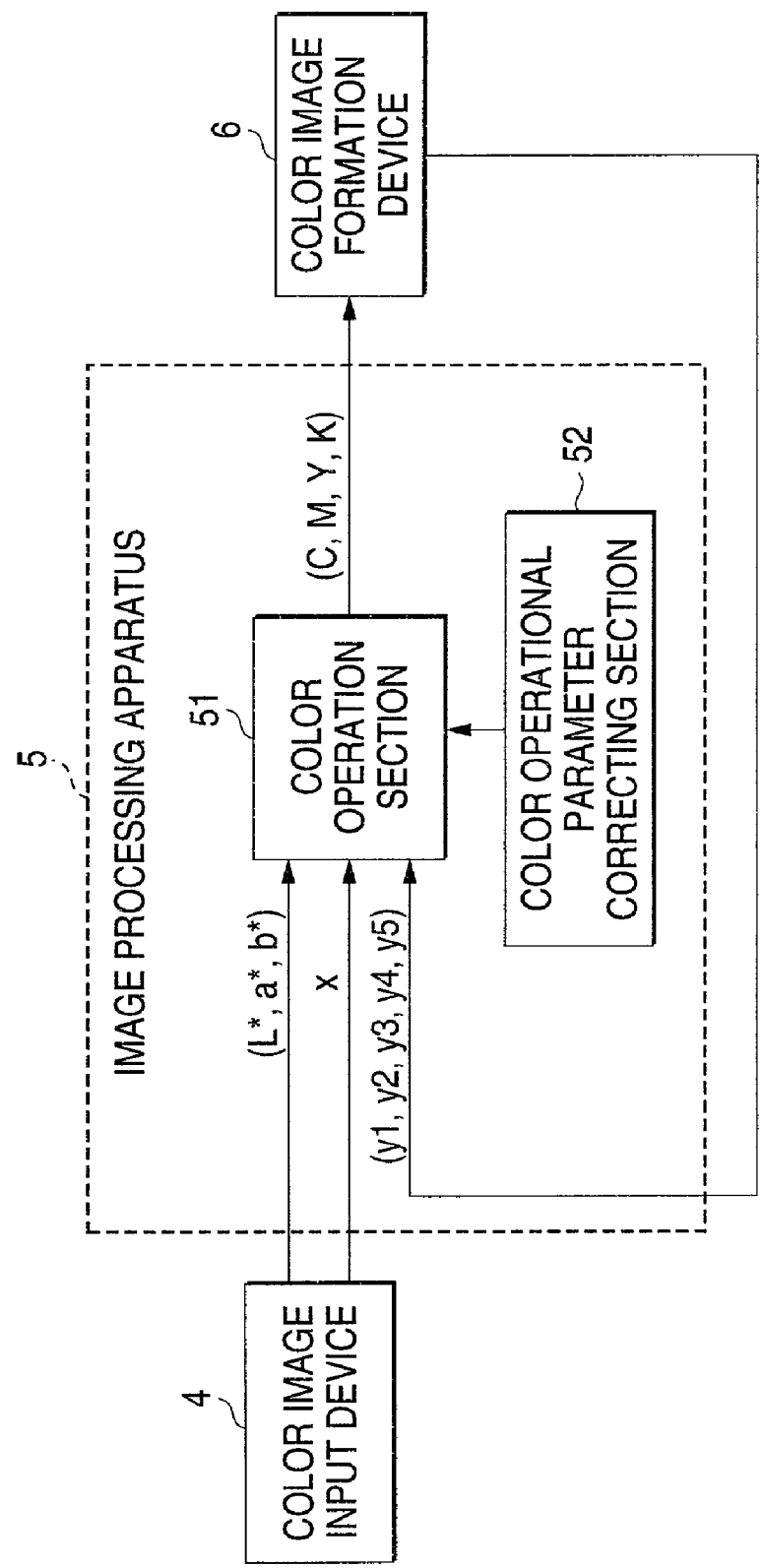
FIG. 6 is a block diagram showing a second embodiment of the image processing apparatus according to the invention.

FIG. 6 is a block diagram showing a second embodiment of the image processing apparatus according to the invention. As shown in FIG. 6, a reference number 4 denotes a color image input device, 5 denotes an image processing apparatus, 6 denotes a color image formation device, 51 denotes a color operation section and 52 denotes a color operational parameter correcting section. In the second embodiment, a case that the invention is applied to a full color image formation device in which plural image carriers are asynchronous with paper is described. The image processing apparatus 5 composes a color image output system together with the color image input device 4 and the color image formation device 6.

The color image input device 4 receives a color image according to various formats from an external device and outputs a picture signal in CIEL*a*b* color space which is an equipment-independent chrominance signal for example and a signal x showing a recorded position coordinate on a one-dimensional coordinate on paper on which an image corresponding to the picture signal is formed. The one-dimensional coordinate on paper is equivalent to the recorded position coordinate in the horizontal scanning direction of a laser scanner 76 described later in the color image formation device 6.

Concretely, the color image input device 4 has a function for reading a silver photographic film and a reflected manuscript by a CCD sensor as an L*a*b* signal or converting image information transmitted from equipment connected via a network to an L*a*b* signal and transferring the L*a*b* signal to the image processing apparatus 5 together with a signal x showing the recorded position coordinate in the horizontal scanning direction on paper of the L*a*b* signal. Or the color image input device 4 may also rasterize an electronic manuscript in page description language generated by an application or a printer driver run on a personal computer to a raster signal of the L*a*b* signal and may also transfer the raster signal to the color image processing apparatus 2 together with a signal x showing the recorded position coordinate in the horizontal scanning direction on paper of the L*a*b* signal.

A chrominance signal transferred from the color image input device 4 to the image processing apparatus 5 is a chrominance signal having three or more variables showing color information and most generally, is equivalent to CIEL*a*b* color space which is an equipment-independent chrominance signal. However, the invention is not limited to this and the CIEL*a*b* color space may be another color space such as RGB color space, sRGB color space which is its standard color space, Japan Color which is the standard color space in Japan of CMYK color space, SWOP which is standard color space in United States, RGB color space proper to an image input device which is not equipment-independent and CMYK color space.

The image processing apparatus 5 is composed of the color operation section 51 and the color operational parameter correcting section 52 as a whole. A chrominance signal L*a*b* transferred from the color image input device 4, a recorded position coordinate signal x in the horizontal scanning direction on paper, the rotation angle signals (y1, y2, y3, y4) of photo conductors showing a recorded position coordinate in the vertical scanning direction on the four photo conductors 61-1 to 61-4 of the color image formation device 6 described later and a drive position signal y5 of an intermediate transfer belt showing a recorded position coordinate in the vertical scanning direction on an intermediate transfer belt 73 described later are input to the color operation section 51. The color operation section converts the L*a*b* signal input from the color image input device 4 to an image recording signal CMYK of the color image formation device 6 described later based upon these signals. The image recording signal CMYK is a signal showing the dot area ratio of the respective of CMYK in the color image formation device 6. Needless to say, the signal may be also converted to a signal in CMY color space not including black and another color space. The input chrominance signal L*a*b* can be converted to the image recording signal CMYK of the color image formation device 6 by such conversion in consideration of in-plane color variation caused by an image formation process on the photo conductors 61-1 to 61-4 and the intermediate transfer belt 73 respectively of the color image formation device 6. The color operational parameter correcting section 52 suitably corrects an operational parameter in the color operation section 51.

Figure 7:
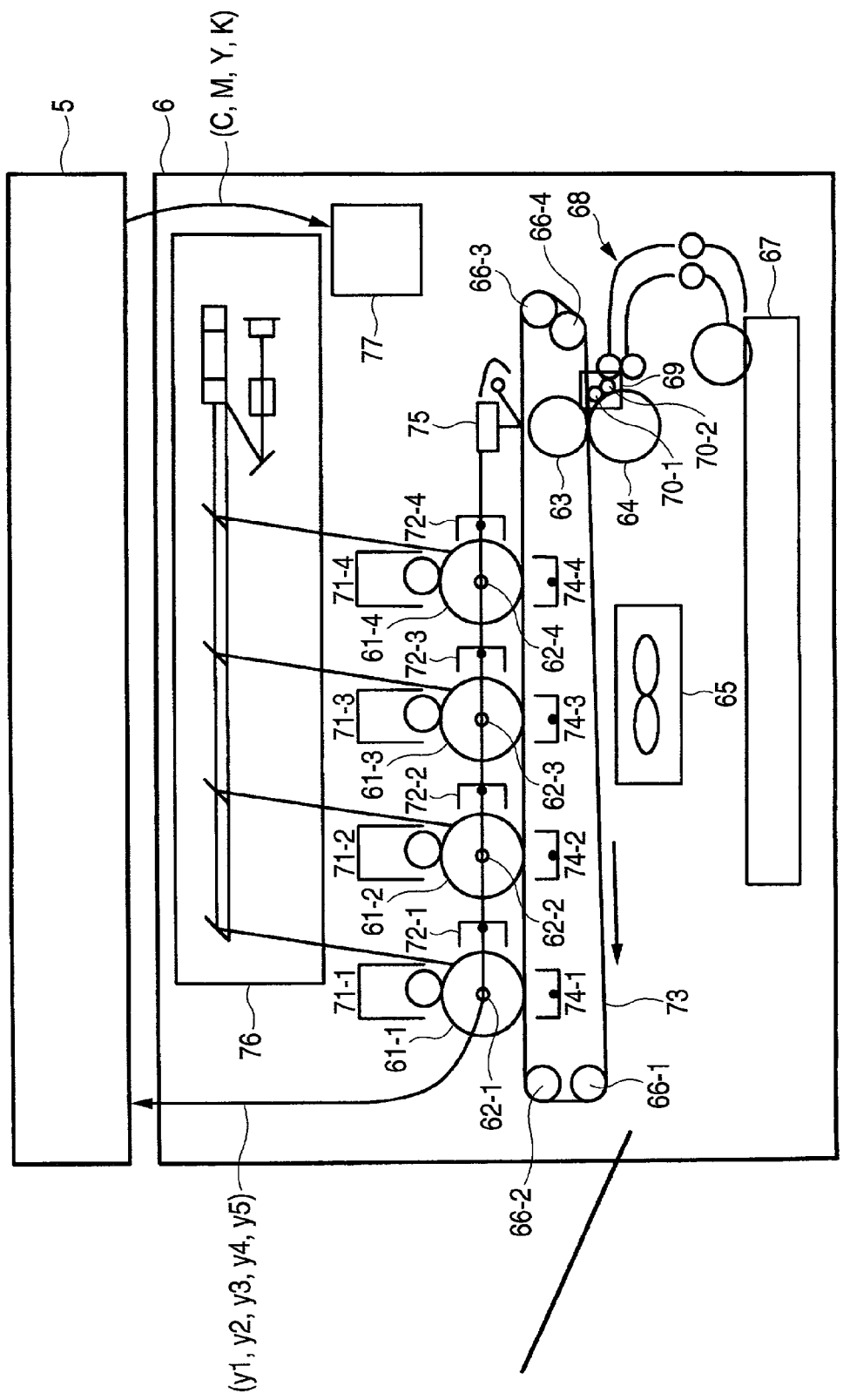
FIG. 7 is a schematic block diagram showing an example of the configuration of a color image formation device.

The color image formation device 6 forms an image on paper according to the image recording signal CMYK transferred from the color operation section 51. FIG. 7 is a schematic block diagram showing an example of the configuration of the color image formation device 6. As shown in FIG. 7, reference numbers 61-1 to 61-4 denote a photoconductor, 62-1 to 62-4 denote a photo conductor drum encoder, 63 and 64 denote a heating roller, 65 denotes a cooling system, 66-1 to 66-4 denote a roller, 67 denotes a paper tray, 68 denotes a paper feeder, 69 denotes a winding/turning mechanism, 70-1 and 70-2 denote a pin roller, 71-1 to 71-4 denote a developer, 72-1 to 72-4 denote an electrifier for forming an electrostatic latent image, 73 denotes an intermediate transfer belt, 74-1 to 74-4 denote a transfer electrifier, 75 denotes an intermediate transfer belt drive position detector, 76 denotes a laser scanner and 77 denotes a screen generator.

The intermediate transfer belt 73 is supported by the rollers 66-1 to 66-4 and the heating roller 63 and is turned in a direction shown by an arrow. The heating roller 64 is arranged opposite to the heating roller 63. The four photo conductors 61-1 to 61-4 respectively arranged in the periphery of the intermediate transfer belt 73 are respectively uniformly electrified by the electrifiers for forming an electrostatic latent image 72-1 to 72-4. Image recording signals of four colors of CMYK transferred from the image processing apparatus 5 are horizontally scanned by the laser scanner 76 as a laser beam the pulse length of which is modulated by the screen generator 77, are radiated on the four photoconductors 61-1 to 61-4 and respectively form an electrostatic latent image.

Next, a black toner image, a yellow toner image, a magenta toner image and a cyan toner image are respectively formed on the four photoconductors 61-1 to 61-4 on which an electrostatic latent image is respectively formed by the black developer 71-1, the yellow developer 71-2, the magenta developer 71-3 and the cyan developer 71-4. These toner images are sequentially transferred onto the intermediate transfer belt 73 by transfer electrifiers 74-1 to 74-4 and toner images of plural colors are formed on the intermediate transfer belt.

The photo conductors 61-1 to 61-4 are respectively independently driven and the respective photo conductors and paper are asynchronous. To specify recorded positions in the vertical scanning direction on the respective photo conductors, the rotation angle signals (y1. y2, y3, y4) of the respective photo conductors are respectively measured by the photo conductor drum encoders 62-1 to 62-4 respectively attached to the driving systems of the respective photo conductors and are transferred to the image processing apparatus 2.

The intermediate transfer belt 73 is independently driven of the photo conductors 61-1 to 61-4, however, it is driven so that it and paper are synchronous, to specify a recorded position in the vertical scanning direction on the intermediate transfer belt, a drive position signal y5 in the vertical scanning direction of the intermediate transfer belt 73 is detected by the intermediate transfer belt drive position detector 75 and is transferred to the image processing apparatus 5.

Afterward, after recording paper fed by the paper feeder 68 from the paper tray 67 is heated, being wound on the heating roller 64 by the pin rollers 70-1 and 70-2 attached to the winding/turning mechanism 69, it is heated in a state in which the recording paper adheres to the intermediate transfer belt 73, being pressed by the heating rollers 63 and 64.

The intermediate transfer belt 73 and the recording paper respectively pressurized and heated by the heating rollers 63 and 64 are moved with them closely contact and are cooled by the cooling system 65. Hereby, toner coheres and solidifies and strong adhesive strength is caused between the toner and the recording paper. Afterward, on the roller 66-1 having a small diameter, the recording paper is separated from the intermediate transfer belt 73 together with the toner by the nerve of the recording paper itself and a color image is formed by transferring and fixing the toner on the recording paper.

For the photo conductors 61-1 to 61-4, various organic photoconductors can be used in addition to various inorganic photoconductors (Se, a-Si, a-SiC, CdS). Toner is composed of thermoplastic binder including pigment such as yellow, magenta and cyan and well-known material can be used. For example, polyester toner the weight average molecular weight of which is 54000, the softening point of which is 113° C. and the mean particle diameter of which is 7 μm can be used. It is desirable that the exposure condition or the developing condition is set so that the amount of toner of each color on a record medium is approximately 0.4 to 0.7 mg/cm$^2$ according to the percentage content of each pigment and for example, the amount of the toner of each color can be set to 0.65 mg/cm$^2$. For a record medium, paper J manufactured by Fuji Xerox can be used as plain paper. For paper the surface of which is smooth, J coated paper manufactured by Fuji Xerox can be used. Needless to say, another record medium can be also used.

For the intermediate transfer belt 73, an intermediate transfer belt with two-layer structure of a base layer and a superficial layer can be used. For the base layer, a polyimide film to which carbon black is added and which has the thickness of 70 μm can be used. The amount of added carbon black varies depending upon the volume resistivity and it is desirable that the amount is approximately $10^{10}$ Ωcm. For the base layer, a sheet the thickness of which is 10 to 300 μm and the heat resistance of which is high can be used and a polymer sheet such as polyester, polyethylene terephthalate, polyether sulfone, polyether ketone, polysulfone, polyimide, polyimide amide and polyamide can be used. It is desirable that for the superficial layer, to transfer a toner image from the photo conductor onto the intermediate transfer belt 73 without the electrostatic disorder of the image, the volume resistivity is adjusted to approximately $10^{14}$ Ωcm and to enhance the close contact of the intermediate transfer belt and a record medium having the toner image between them when simultaneous transfer and fixing from the intermediate transfer belt 73 onto paper are made, a silicon copolymer the hardness of which is 40 degrees and the thickness of which is 50 μm is used. As the surface of the silicon copolymer has tackiness to toner at ordinary temperature and further, the silicon copolymer has a characteristic to easily isolate melted and fluidized toner to efficiently transfer the toner onto the record medium, the silicon copolymer is optimum for the superficial layer. For the superficial layer, a resin layer the thickness of which is 1 to 100 μm for example and the parting property of which is strong can be used and for example, a tetrafuluoroethylene perfluoroalkylvinylether copolymer and polytetrafluoroethylene can be used.

For the heating rollers 63 and 64, a metallic roller or a metallic roller provided with a heat-resistant elastic layer made of silicon rubber and others can be used. A heat source is arranged inside the heating rollers 63 and 64 and its set temperature is determined depending upon the characteristic of thermic melting of toner and the thermoplastic resin layer on the surface of recording paper, however, as the temperature of the softening point of toner is set so that it is higher than that of the softening point of the resin layer, the temperature is set so that the set temperature of the heating roller 63 is higher than that of the heating roller 64. For example, the temperature of the heating roller 63 can be set to 150° C. and that of the heating roller 64 can be set to 120° C. Pressure between the heating rollers 63 and 64 in transfer and fixing can be set to 5 kgf/cm$^2$, however, the pressure is not limited to this value and has only to be in a range of 1 to 10 kgf/cm$^2$. In this example, each outside diameter of the heating rollers 63 and 64 is set to 50 mm and the rotational speed of the heating roller is set so that the speed of the intermediate transfer belt 73 is 240 mm/s. Needless to say, the invention is not limited to these settings.

The temperature of the surface of a record medium touched to the intermediate transfer belt 73 when the record medium is peeled from the intermediate transfer belt 73 is adjusted by adjusting the gas volume of the cooling system 65. The gas volume can be adjusted so that the superficial temperature of a record medium is approximately 70° C. Further, the intermediate transfer belt drive position detector 75 detects the reference position and the drive position of the intermediate transfer belt 73 by reading a pattern on the intermediate transfer belt 73 by a non-contact sensor for example. In addition, the drive position in the vertical scanning direction of the intermediate transfer belt 73 may be also detected by a roller touched to the intermediate transfer belt 73 for detecting the drive position and an encoder attached to a driving system for driving the intermediate transfer belt 73.

In the color image formation device 6 of the type shown in FIG. 7, as electrification, exposure and developing are performed on the photo conductor which is an image carrier, color variation caused by electrification, exposure and developing is repeated depending upon a two-dimensional position on the photo conductor. As transfer and fixing are performed on the intermediate transfer belt which is an image carrier, color variation caused by transfer and fixing is repeated depending upon a two-dimensional position on the intermediate transfer belt. As paper and the photo conductors 61-1 to 61-4 which are image carriers are not synchronous as described above, a pattern of color variation caused by the photo conductor on paper does not reappear, however, color variation caused by the photo conductor due to a predetermined two-dimensional position on the photo conductors 61-1 to 61-4 is repeated. Therefore, if two-dimensional recorded position coordinates (x, y1, y2, y3, y4) on the photo conductors 61-1 to 61-4 are considered, the correction of color variation caused by the photo conductor is possible. At this time, as a recorded position coordinate x in the horizontal scanning direction is the same as a recorded position coordinate in the horizontal scanning direction on paper, a signal specified by the color image input device 4 may be used and only the rotation angle signals (y1, y2, y3, y4) of the respective photo conductors 61-1 to 61-4 showing a recorded position coordinate in the vertical scanning direction have only to be measured. Needless to say, a recorded position coordinate x in the horizontal scanning direction may be also transferred from the color image formation device 6 to the image processing apparatus 5. It is described above that in the color image formation device 6, the four photo conductors 61-1 to 61-4 are asynchronous, however, in case four photo conductors are synchronous, only one rotation angle signal of the photo conductor has only to be detected.

In the color image formation device 6 shown in FIG. 7, as paper and the intermediate transfer belt 73 which is an image carrier are synchronous, a pattern of the unevenness of the density caused by the intermediate transfer belt on paper reappears. As described above, even if a recorded position on paper and recorded position coordinates on the intermediate transfer belt are synchronous, the correction of the unevenness of the density caused by the intermediate transfer belt is possible if two-dimensional recorded position coordinates (x, y5) on the intermediate transfer belt are considered. In this case, as a recorded position coordinate x in the horizontal scanning direction is the same as a recorded position coordinate in the horizontal scanning direction on paper, a signal specified by the color image input device 4 may be also used and only a drive position signal y5 of the intermediate transfer belt showing a recorded position coordinate in the vertical scanning direction has only to be measured. Needless to say, a recorded position coordinate x in the horizontal scanning direction common to that on the photo conductor may be also output from the color image formation device 6. In case the intermediate transfer belt 73 is synchronous with paper, a recorded position coordinate signal in the vertical scanning direction on paper may be also input from the color image input device 4 in place of the drive position signal y5 of the intermediate transfer belt.

In the color image formation device 6 shown in FIG. 7, as a slight slide is caused between the photo conductors 61-1 to 61-4 and the intermediate transfer belt 73 to absorb a mechanical dimensional error and an operational error, the photo conductors 61-1 to 61-4 and the intermediate transfer belt 73 are asynchronous. Therefore, color variation caused by the photo conductors 61-1 to 61-4 and color variation caused by the intermediate transfer belt 73 are independently caused. Therefore, to specify color variation caused by all image carriers, six parameters of a recorded position coordinate signal x in the horizontal scanning direction on paper, the rotation angle signals (y1, y2, y3, y4) of the four photo conductors 61-1 to 61-4 and a drive position signal y5 of the intermediate transfer belt 73 are required to be detected.

In the above-mentioned description of the color image formation device 6, the example that the photo conductors 61-1 to 61-4 and the intermediate transfer belt 73 are asynchronous is shown, however, a parameter required to be detected to determine a recorded position in the vertical scanning direction in case the four photo conductors and the intermediate transfer belt are synchronous may be any of the rotation angle signals of the photo conductors 61-1 to 61-4 and a drive position signal of the intermediate transfer belt 73. In case the four photo conductors 61-1 to 61-4 are synchronous and they and the intermediate transfer belt 73 are asynchronous, parameters required to be detected to determine a recorded position coordinate in the vertical scanning direction may be total two of one of the rotation angle signals of the photo conductors 61-1 to 61-4 and a drive position signal of the intermediate transfer belt 73.

In FIG. 7, as an example of the color image formation device 6, the configuration of the tandem electrophotographic system in which a color image is formed using four photo conductors is shown, however, the configuration of the color image formation device 6 is not limited to this. For example, a single type electrophotographic system in which a color image is formed by sequentially transferring a toner image on an intermediate transfer belt or on paper using one photo conductor may be also applied. A method using a belt photoconductor may be also applied in place of using a photo conductor as an image carrier. A method of electrostatically transferring a toner image from an intermediate transfer belt onto paper and fixing the toner image by a normal fixing device may be also applied in place of the method of directly transferring and fixing from the intermediate transfer belt which is an image carrier onto paper as in the above-mentioned example.

As described above, in the second embodiment of the image processing apparatus according to the invention, a color image formation device of any type that records a color image in color space having three or more variables and forms an image on a single or plural image carriers may be also used and even if a single or plural image carriers and paper are synchronous or asynchronous, the image processing apparatus according to the invention can be applied. The color image formation device 6 is not limited to an electrophotographic method, any color image formation device may be also applied and for example, the image processing apparatus according to the invention can be applied to any color image formation device according to an ink-jet method, a thermal imprint method, a silver photographic method and others in which in-plane color variation is repeated depending upon recorded position coordinates of an input image on an image carrier.

Figure 8:
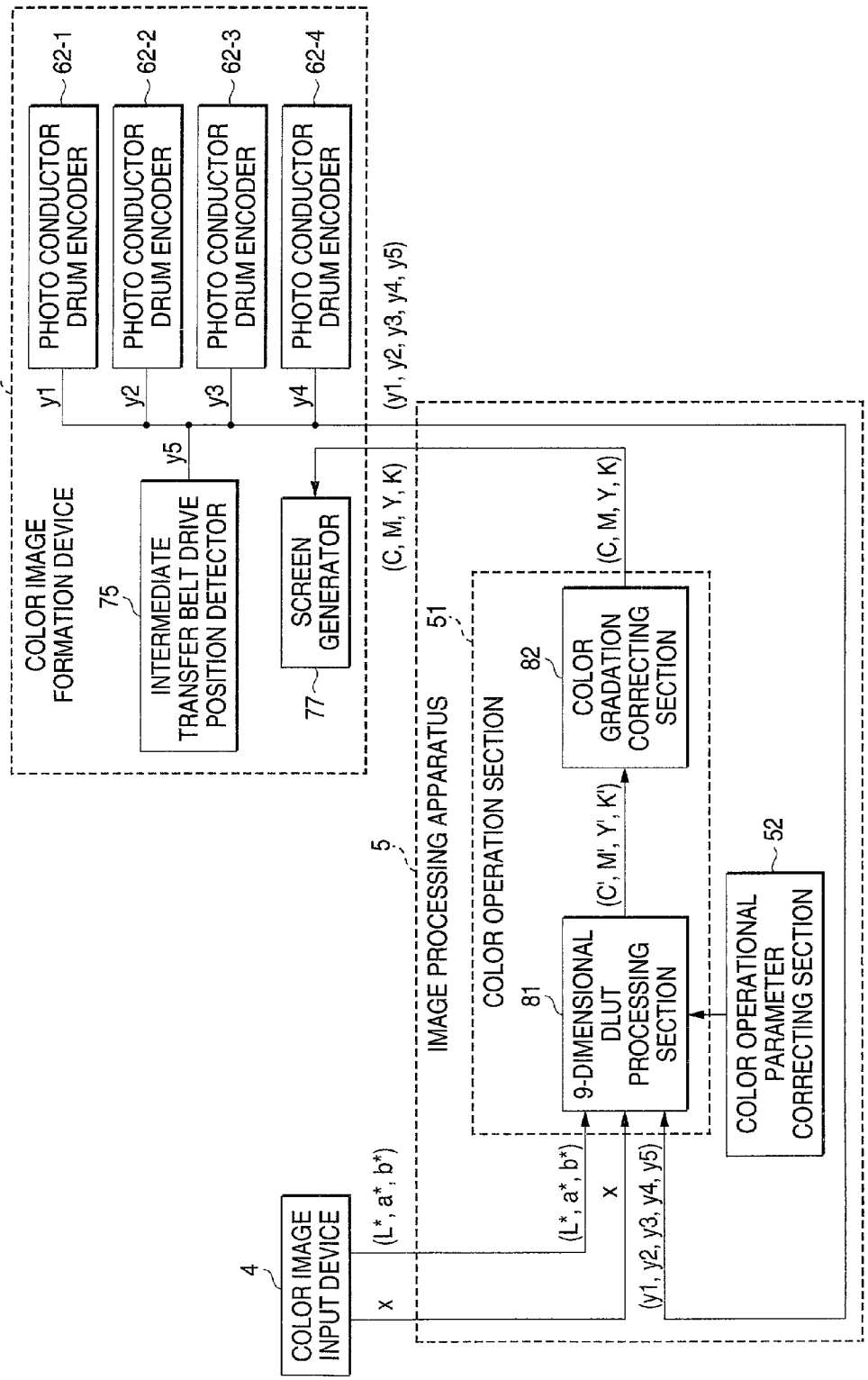
FIG. 8 is a block diagram showing a concrete example in the second embodiment of the image processing apparatus according to the invention.

Next, the image processing apparatus 5 will be further described. FIG. 8 is a block diagram showing a concrete example in the second embodiment of the image processing apparatus according to the invention. As shown in FIG. 8, a reference number 81 denotes a nine-dimensional DLUT processing section and 82 denotes a color gradation correcting section. A color space signal L*a*b* input from the color image input device 4, a recorded position coordinate signal x of an input image in the horizontal scanning direction on paper, the rotation angle signals (y1, y2, y3, y4) of the photo conductors 61-1 to 61-4 input from the photo conductor drum encoders 62-1 to 62-4 of the color image formation device 6 showing a recorded position coordinate of the input image in the vertical scanning direction on an image carrier and a drive position signal y5 of the intermediate transfer belt 73 input from the intermediate transfer belt drive position detector 75 are input to the nine-dimensional DLUT processing section 81. Nine-dimensional interpolation based upon an operational parameter described later is made based upon these signals, the image recording signal CMYK of the color image formation device 6 is converted to a lightness linear signal C'M'Y'K' which is in color space acquired by linearly converting the image recording signal CMYK of the color image formation device 6 to lightness and they are transferred to the color gradation correcting section 82. An operational parameter of the nine-dimensional DLUT processing section 81 can be corrected according to a method described later by the color operational parameter correcting section 52.

In the color gradation correcting section 82, the lightness linear signal C'M'Y'K' input from the nine-dimensional DLUT processing section 81 is converted to the image recording signal CMYK of the color image formation device 6 using one-dimensional LUT provided every color component and the image recording signal CMYK is transferred to the screen generator 77 of the color image formation device 6. This one-dimensional LUT (a gradation correction table) can be determined by a well-known method. Needless to say, the color gradation correcting section 82 may also use any processing method if only nonlinear conversion having one input and one output is enabled in addition to being composed of one-dimensional LUT.

As described above, the color gradation correcting section 82 converts the lightness linear signal C'M'Y'K' to the image recording signal CMYK of the color image formation device 6 using one-dimensional LUT and this purpose is to enhance correction precision in the nine-dimensional DLUT processing section 81 by linearizing the input-output of the nine-dimensional DLUT processing section 81 based upon lightness L*a*b*. Needless to say, an image recording signal CMYK may be also directly acquired based upon signals (L*, a*, b*, x, y1, y2, y3, y4, y5) by the nine-dimensional DLUT processing section 81 without providing the color gradation correcting section 82.

The nine-dimensional DLUT processing section 81 holds a correspondence table between input addresses (L*, a*, b*, x, y1, y2, y3, y4, y5) and dot signals (C', M', Y', K') as operational parameters as a lookup table. For an input signal except the input addresses, nonlinear conversion having nine inputs and four outputs is realized by interpolation. For the interpolation algorithm of the nine-dimensional DLUT processing section 81, well-known interpolation algorithm can be applied and for example, for interpolation algorithm, nine-dimensional hypercube interpolation can be used.

The divided number of an input address in the nine-dimensional DLUT processing section 81 is arbitrary, however, for example, an input address can be divided so that an input chrominance signal L*a*b* is divided into 16 every shaft, a recorded position coordinate signal x in the horizontal scanning direction on paper is divided into 30, the rotation angle signals (y1, y2, y3, y4) of the photo conductors 61-1 to 61-4 are divided into 27 and a drive position signal y5 of the intermediate transfer belt 73 is divided into 42. For example, in the color image formation device 6, in case the width and the length of paper are 297 mm and 420 mm in maximum A3 size and the diameter of the photo conductor is 87 mm, an operational parameter can be held at an interval of 10 mm both in the horizontal scanning direction and in the vertical scanning direction when it is converted to a recorded position coordinate on paper. In the configuration of the color image formation device 6 shown in FIG. 7, as an exposer is a single laser beam source and in addition, a frequency of the nonuniformity of the sensitivity of the photo conductor and the intermediate transfer belt is not high so much, it can be said that a correction value has enough resolution if the operational parameter is held at the interval of 10 mm on paper as described above. As the density linearly varies in the horizontal scanning direction even if the unevenness of the density is caused because an interval between the developer and the photo conductor is not fixed, the unevenness of the density can be corrected enough by division to this extent. Needless to say, the divided number of an input address held in the nine-dimensional DLUT processing section 81 may be also changed depending upon a level of the unevenness of the sensitivity of the photo conductor and the unevenness of the volume resistivity of the intermediate transfer belt and the divided number in the invention is not limited to the above-mentioned divided number.

As described above, the divided number of input addresses (L*, a*, b*, x, y1, y2, y3, y4, y5) maybe also flexibly changed according to a level of the nonlinearity of color reproducibility in the color image formation device 6 and in-plane color variation. Concretely, in case the nonlinearity of color reproducibility is high, the degree of color variation is large and a frequency of color variation is high, the divided number has only to be increased.

In case color variation caused by either image carrier of the photo conductor or the intermediate transfer belt is at a level at which the color variation is not a problem for color variation on paper, only either of the rotation angle signal of the photo conductor or a drive position signal of the intermediate transfer belt has only to be input to the color operation section 51. In case color variation in either of the horizontal scanning direction or the vertical scanning direction is at a level at which the color variation is not problem for color variation on paper, only a signal in either of the horizontal scanning direction or the vertical scanning direction has only to be input to the color operation section 51.

For example, in case in-plane color variation caused by the photo conductor is at a level at which the color variation is not a problem visually and for color variation by the intermediate transfer belt, color variation in the horizontal scanning direction is also visually not a problem, an input address to the nine-dimensional DLUT processing section 81 is (L*, a*, b*, y5) and conversion having four inputs and four outputs has only to be made. Therefore, in such a case, it is desirable that operation is performed by well-known four-dimensional interpolation using not nine-dimensional DLUT but four-dimensional DLUT. As described above, the great reduction of the amount of operation using DLUT and an operation table can be realized by omitting a recorded position coordinate signal on an image carrier at a level of color variation at which the color variation is not problem visually of an input image.

Figure 9:
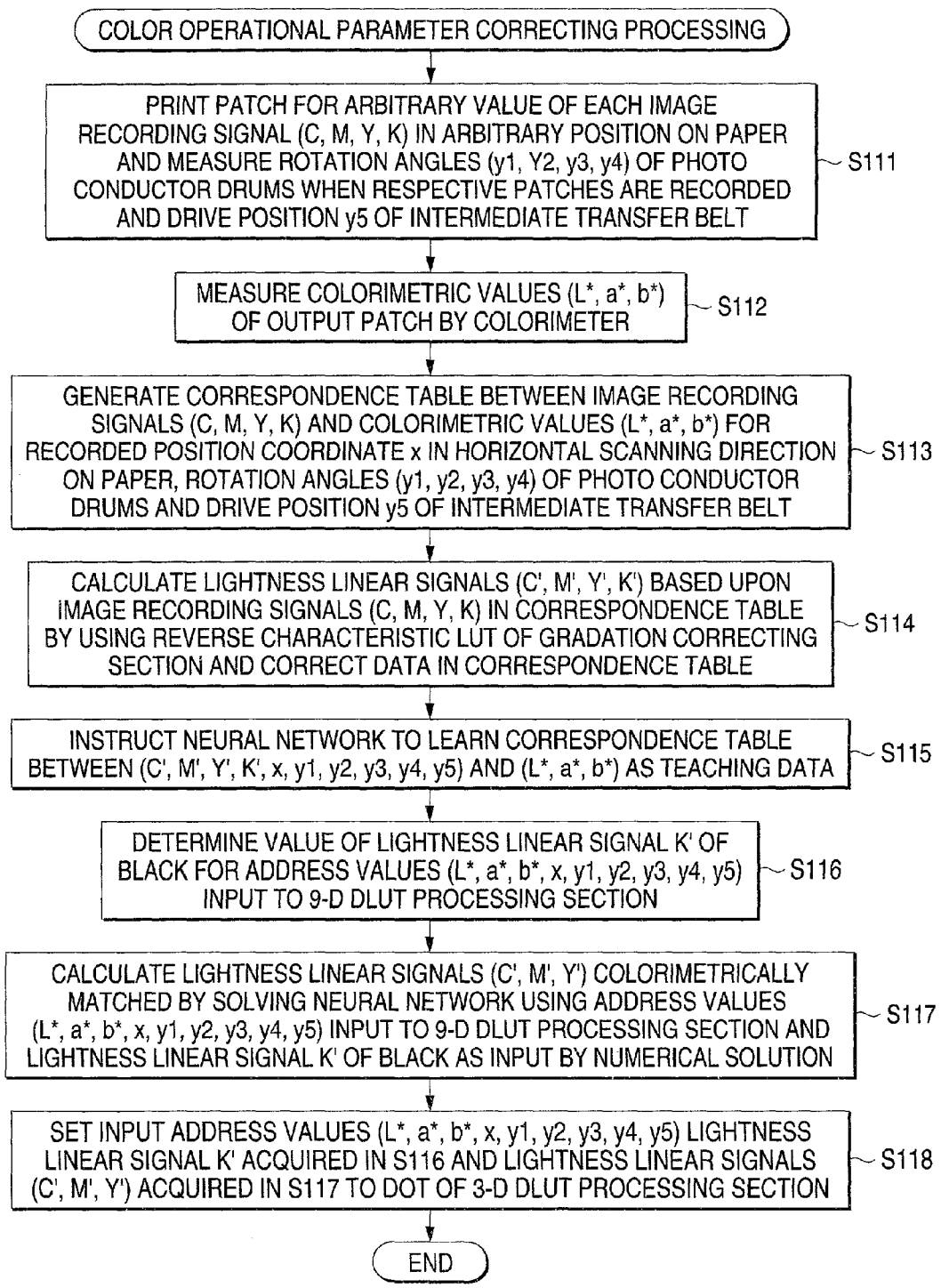
FIG. 9 is a flowchart showing an example of a method of determining an operational parameter of a nine-dimensional DLUT processing section by a color operational parameter correcting section in the second embodiment of the image processing apparatus according to the invention.

FIG. 9 is a flowchart showing an example of a method of determining an operational parameter of the nine-dimensional DLUT processing section 81 by the color operational parameter correcting section 52 in the second embodiment of the image processing apparatus according to the invention. First, in S111, a patch corresponding to an arbitrary value of an image recording signal CMYK is arranged and printed in an arbitrary position on paper shown in FIG. 5 for example in the color image formation device 6 as in the first embodiment and the rotation angles (y1, y2, y3, y4) of the photo conductors 61-1 to 614 and a drive position y5 of the intermediate transfer belt 73 when the patch is recorded are measured and stored. In case the divided number in the horizontal scanning direction and the vertical scanning direction on paper is set to an interval of 10 mm as described above, a patch has only to be output on overall paper at an interval between patches of 10 mm in the horizontal scanning direction and the vertical scanning direction. The dot area ratio of a patch in CMYK respectively ranges from 0% to 100% by 10%, patches have only to be output in arbitrary combination and to be arranged at random on paper.

In S112, the colorimetric value L*a*b* of the output patch is measured by a colorimeter not shown. For the colorimeter, DTP-51 manufactured by X-Rite and others can be used. Needless to say, the colorimeter is not limited to such a colorimeter on the market and a colorimetric value L*a*b* may be also determined based upon an RGB signal acquired using a flatbed scanner.

In S113, a correspondence table between (C, M, Y, K, x, y1, y2, y3, y4, y5) and (L*, a*, b*) is generated based upon the result of the measurement of the colorimetric values L*a*b* of respective patches and the result of the measurement of an image recording signal CMYK, a recorded position coordinate x in the horizontal scanning direction on paper, the rotation angles (y1, y2, y3, y4) of the photo conductors 61-1 to 61-4 and a drive position y5 of the intermediate transfer belt 73.

In S114, a lightness linear signal C'M'Y'K' is calculated based upon the image recording signal CMYK using reverse characteristic LUT in the color gradation correcting section 82 and a value of the image recording signal CMYK in the correspondence table is corrected to the lightness linear signal C'M'Y'K'.

In S115, a function having ten inputs and three outputs shown in the following expression having (C', M', Y', K', x, y1, y2, y3, y4, y5) as input and having (L*, a*, b*) as output is generated based upon the correspondence table between (C', M', Y', K', x, y1, y2, y3, y4, y5) and (L*, a*, b*).

$$(L^*, a^*, b^*) = g(C', M', Y', K', x, y1, y2, y3, y4, y5) \quad (3)$$

Such a function can be determined in the expression (3) by learning by backpropagation using a neural network having ten inputs and three outputs for example and using the correspondence table between (C', M', Y', K', x, y1, y2, y3, y4, y5) and (L*, a*, b*) as teaching data. A method of determining such a function is not limited to the method of using the neural network and any method of describing a nonlinear function having ten inputs and three outputs may be used.

In S116, a value of a lightness linear signal K' of black corresponding to address values (L*, a*, b*, x, y1, y2, y3, y4, y5) input to the nine-dimensional DLUT processing section 81 is determined. The lightness linear signal K' can have finite 256 values in the case of quantization by eight bits for example. Therefore, in respective cases of 0 to 255 of the lightness linear signal K', a range of the lightness linear signal K' based upon which a lightness linear signal C'M'Y' colorimetrically matched can be calculated can be calculated by inputting input address values (L*, a*, b*, x, y1, y2, y3, y4, y5) and the lightness linear signal K' and solving the expression (3) acquired using the neural network by numerical solution. The lightness linear signal K' can be determined by selecting an arbitrary value in the calculated range.

The algorithm of determining the lightness linear signal K' is not limited to the above-mentioned method and a well-known method can be applied. For example, the lightness linear signal K' may be also directly specified based upon a lightness signal L* having an address value input to nine-dimensional DLUT processing section 81 so that no black exists in a location the lightness of which is high and much black exists in a location the lightness of which is low.

In S117, the lightness linear signal C'M'Y' colorimetrically matched is calculated by inputting address values (L*, a*, b*, x, y1, y2, y3, y4, y5) input to the nine-dimensional DLUT processing section 81 and the lightness linear signal K' determined in S116 and solving the expression (3) acquired using the neural network by numerical solution.

Finally, in S118, the lightness linear signal K' acquired in S116 and the lightness linear signal (C'M'Y') acquired in S117 are set at a dot shown by the input address values (L*, a*, b*, x, y1, y2, y3, y4, y5) and the operational parameters of the nine-dimensional DLUT processing section 81 can be set.

It is clear that when the lightness linear signal K' showing the amount of ink for colorimetric values (L*, a*, b*) and (x, y1, y2, y3, y4, y5) showing a recorded position on an image carrier are determined in the expression (3), the only one combination (C'M'Y') of the residual three colors of the lightness linear signal is determined. That is, it is known that even in a color image formation device where in-plane color variation exists, even if color is input if relation between an image recording signal and a chrominance signal is determined in consideration of recorded position coordinates on an image carrier that causes color variation, an image recording signal for outputting color accurately matched with the input color can be determined. The occurrence of color difference caused due to recorded position coordinates on paper can be prevented in principle by recording an image according to an image recording signal determined by such algorithm, which was impossible in prior art. Therefore, high-precision color conversion is enabled and the occurrence of irregular color when a uniform image is output can be prevented.

In the concrete example of the color operation section 51, the image recording signal (CMYK) is calculated based upon an input signal (L*, a*, b*, x, y1, y2, y3, y4, y5) using the nine-dimensional DLUT, however, the invention is not limited to this. For example, operation may be also performed by solving the expression (3) by the numerical operation shown in S116 and S117 shown in FIG. 9 at real time.

To verify the effect of the second embodiment of the image processing apparatus according to the invention, color conversion precision in case color conversion considering the recorded position coordinates of an input image on plural image carriers is made by the color operation section 51 and in case conventional type color conversion without considering recorded position coordinates on an image carrier is made is evaluated. For an example of prior art, well-known three-dimensional DLUT color conversion having a signal $L^*a^*b^*$ as input and the lightness linear signal C'M'Y'K' as output (having three inputs and four outputs) is made for processing in the nine-dimensional DLUT processing section 81.

For a example for comparison, in the color image formation device 6, process black composed of three colors of CMY having the dot area ratio of 10 to 100% is output on overall paper in A3 size, colorimetric values $L^*a^*b^*$ at arbitrary 100 points in a plane are measured and the average value of color difference at each point from $L^*a^*b^*$ averaged in the plane is compared. As a result, the average color difference in prior art is approximately 6, while in case the image processing apparatus according to the invention is used, the average color difference is approximately 1 and it can be verified that color conversion precision is greatly improved. When a uniform image is output, irregular color can be also reduced up to a level at which the irregular color is not a problem at all visually.

As described above, the image recording signal of the color image formation device is calculated based upon a chrominance signal input from the color image input device, a recorded position coordinate signal in the horizontal scanning direction on paper, the rotation angle signal of the photo conductor showing a recorded position coordinate in the vertical scanning direction on an image carrier and a drive position signal of the intermediate transfer belt by DLUT processing and others. Hereby, in the electrophotographic color image formation device, even if color variation in a two-dimensional plane on paper is caused due to an image formation process represented by the nonuniformity of the sensitivity of the photo conductor and the unevenness of the volume resistivity of the intermediate transfer belt, color difference on the recorded position coordinates of the input image on the image carrier can be prevented in principle. Therefore, high-precision color conversion can be realized. Even if a uniform image is output, irregular color as a defect of image quality can be reduced up to a level at which the irregular color is not problem visually and a print the in-plane uniformity of which is high and which has high image quality can be acquired.

Further, even if paper and an image carrier such as the photo conductor and the intermediate transfer belt are asynchronous, the occurrence of irregular color is securely prevented by considering recorded position coordinates of a signal or plural image carriers related to the image formation process in which in-plane color variation is caused and high color conversion precision can be realized.

In addition, even if a color variation characteristic varies because of aging and the replacement of image carriers, the occurrence of irregular color is securely prevented by suitably correcting an operational parameter of the color operation section 51 and high color conversion precision can be maintained.

As clear from the above-mentioned description, according to the invention, in the image processing apparatus that executes processing for color conversion, the image recording signal of the image formation device is calculated based upon relation determined by a chrominance signal input from the image input device and a recorded position coordinate signal of an input image on the image carrier of the image formation device using DLUT for example. Hereby, the occurrence of color difference caused due to a two-dimensional recorded position on the image carrier can be prevented in principle, which was impossible in prior art and in an image formation device the in-plane uniformity of which is low, high color conversion precision can be also acquired. Even if a uniform image is output, irregular color caused in a two-dimensional plane on paper can be reduced up to a level at which the irregular color is not a problem visually. At this time, there is effect that as relation for color conversion is determined in consideration of a chrominance signal input together with a recorded position coordinate signal, nonlinearity such as a gradation characteristic and a multiple transfer characteristic can be simultaneously satisfactorily corrected and color conversion precision can be greatly enhanced.

Further, even if paper and the image carrier such as the photo conductor and the intermediate transfer belt are asynchronous, the occurrence of irregular color is securely prevented by considering a recorded position of an input image on the image carrier related to the image formation process that causes in-plane color variation and high color conversion precision can be acquired.

In addition, there is also effect that as relation determined based upon an input image and a recorded position of the image such as an operational parameter in the arithmetic means can be updated, the occurrence of irregular color is securely prevented even if a color variation characteristic varies by aging and the replacement of image carriers and high color conversion precision can be maintained.

What is claimed is:

1. An image processing apparatus for converting a first chrominance signal to a second chrominance signal which is an image recording signal for an image formation device, comprising:
    an operating section that converts the first chrominance signal into the second chrominance signal based on relation determined by the first chrominance signal and a recorded position coordinate signal, the recorded position coordinate signal showing a position on an image carrier where an image is recorded according to the second chrominance signal, wherein
    the operating section acquires the relation by solving a function to acquire the first chrominance signal from the second chrominance signal and the recorded position coordinate signal, with the first chrominance signal and the recorded position coordinate signal as an input; and
    the operating section converts the first chrominance signal into the second chrominance signal based on the relation.

2. The image processing apparatus according to claim 1, wherein:
    the image formation device has a plurality of image carriers; and
    the operating section uses the recorded position coordinate signal including positional information of each of all or a part of the plural image carriers.

3. The image processing apparatus according to claim 1, further comprising a correcting section that updates the relation determined based upon the first chrominance signal and the recorded position coordinate signal in the operating section.

4. The image processing apparatus according to claim 1, wherein the operating section includes an n-dimensional lookup table.

* * * * *